United States Patent
Shimada et al.

[11] Patent Number: 5,949,507
[45] Date of Patent: Sep. 7, 1999

[54] ACTIVE MATRIX SUBSTRATE AND LIQUID CRYSTAL DISPLAY APPARATUS HAVING ELECTRICAL CONTINUITY ACROSS CONTACT HOLES, AND METHOD FOR PRODUCING THE SAME

[75] Inventors: Yasunori Shimada, Kashihara; Hisakazu Nakamura, Yamatokoriyama; Koji Taniguchi, Tenri, all of Japan

[73] Assignee: Sharp Kabushiki Kaisha, Osaka, Japan

[21] Appl. No.: 08/757,254

[22] Filed: Nov. 27, 1996

[30] Foreign Application Priority Data

Nov. 28, 1995 [JP] Japan .................................. 7-309612
Mar. 13, 1996 [JP] Japan .................................. 8-056579

[51] Int. Cl.$^6$ .......................... G02F 1/136; G02F 1/1335; G02F 1/1343
[52] U.S. Cl. .............................. 349/113; 349/139; 349/43
[58] Field of Search ................................. 349/113, 139, 349/43

[56] References Cited

U.S. PATENT DOCUMENTS

| | | | |
|---|---|---|---|
| 4,519,678 | 5/1985 | Komatsubara et al. | 350/338 |
| 5,610,741 | 3/1997 | Kimura | 349/113 |
| 5,719,647 | 2/1998 | Fujikawa et al. | 349/40 |
| 5,734,457 | 3/1998 | Mitsui et al. | 349/106 |

FOREIGN PATENT DOCUMENTS

| | | |
|---|---|---|
| 56-94386 | 7/1981 | Japan . |
| 56-156864 | 12/1981 | Japan . |
| 6-75238 | 3/1994 | Japan . |
| 7-20500 | 1/1995 | Japan . |
| 7-92502 | 4/1995 | Japan . |

OTHER PUBLICATIONS

D. L. White, et al., Journal of Applied Physics, vol. 45, No. 11, pp. 4718–4723 (1974).

T. Koizumi, et al., Proceedings of the SID, vol. 29/2, pp. 157–160 (1988).

*Primary Examiner*—William L. Sikes
*Assistant Examiner*—Julie Ngo
*Attorney, Agent, or Firm*—Dike, Bronstein, Roberts & Cushman, LLP; David G. Conlin; George W. Neuner

[57] ABSTRACT

A reflection type liquid crystal display apparatus includes: a first substrate having a plurality of reflecting electrodes; a second substrate having a light transmitting electrode; and a liquid crystal layer disposed between the first substrate and the second substrate. The first substrate includes an insulating substrate, a switching device provided on the insulating substrate for supplying a display voltage signal to the reflecting electrode, a drawing-out electrode connected to the switching device and extending under the reflecting electrode, and an insulating resin layer having a contact hole on the drawing-out electrode. The reflecting electrode is provided on the insulating resin layer, corresponding to each pixel, so as to cover the contact hole, and is electrically connected to the drawing-out electrode at the bottom of the contact hole. The drawing-out electrode has at least two different metal layers in a region larger than a bottom of the contact hole, the region including the bottom of the contact hole, and a metal layer which is an uppermost layer of the drawing-out electrode is removed at the bottom of the contact hole in the direction of a thickness either partially or until an underlying metal layer is reached.

15 Claims, 24 Drawing Sheets

FIG.10A
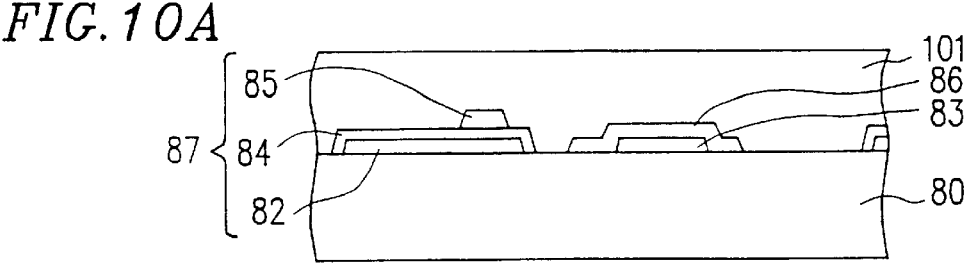
FIG.10B
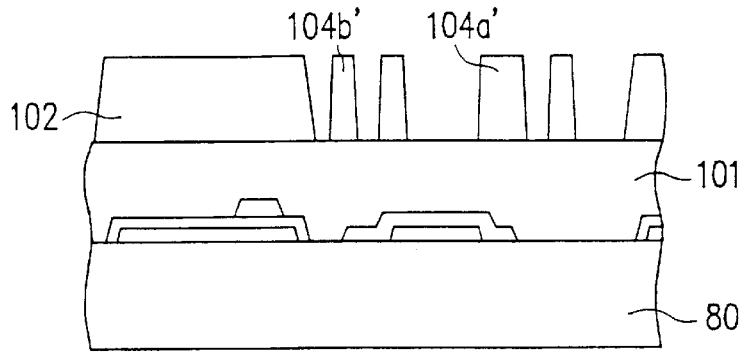
FIG.10C
FIG.10D
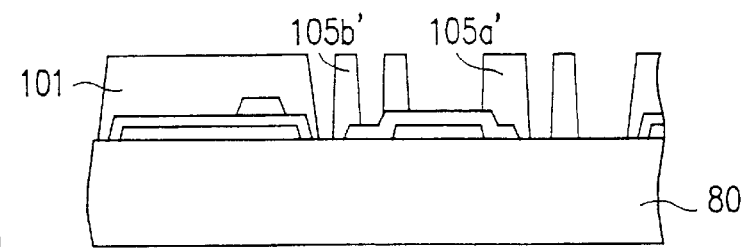
FIG.10E
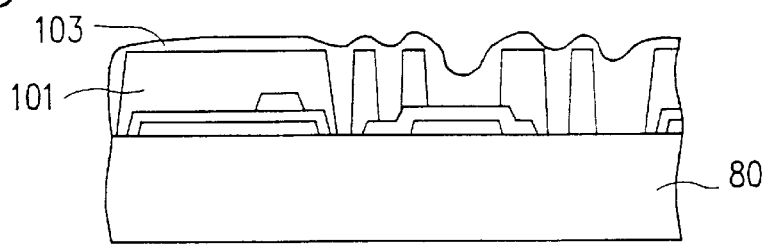
FIG.10F
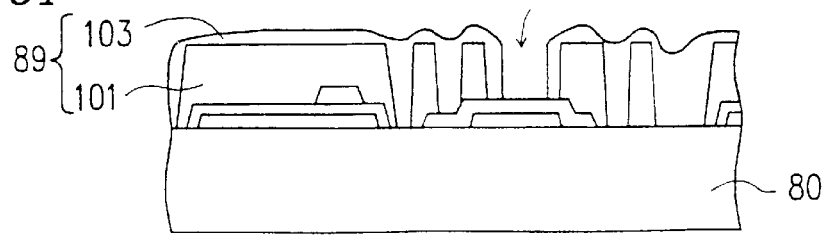

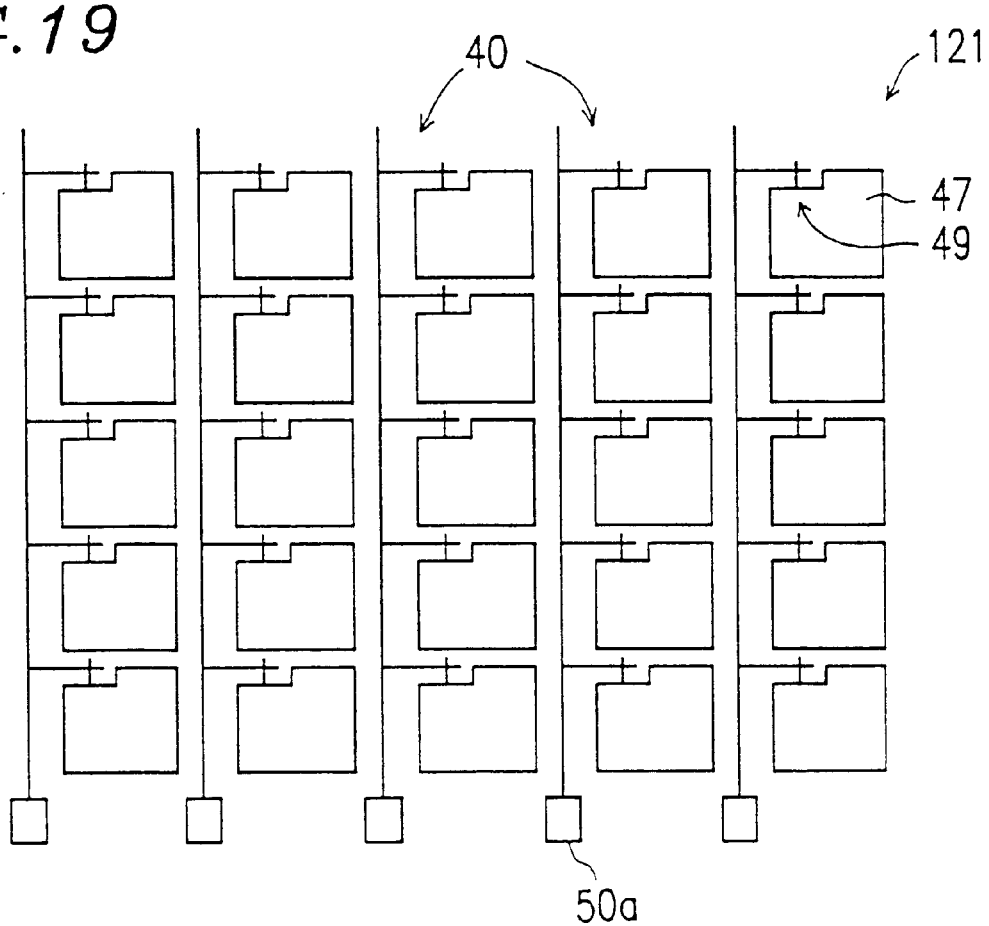

Developing time dependence of the reflection characteristic and the contact resistance

ACTIVE MATRIX SUBSTRATE AND LIQUID CRYSTAL DISPLAY APPARATUS HAVING ELECTRICAL CONTINUITY ACROSS CONTACT HOLES, AND METHOD FOR PRODUCING THE SAME

BACKGROUND OF THE INVENTION

1. Field of the Invention

The present invention relates to an active matrix substrate and a liquid crystal display apparatus, and to a method for producing the same. More particularly, the present invention relates to a liquid crystal display apparatus having excellent continuity of contact holes and excellent image characteristics and to an active matrix substrate capable of realizing such a liquid crystal display apparatus, and to a method for producing the same.

2. Description of the Related Art

Recently, the application of a liquid crystal display apparatus to a word processor, a lap-top personal computer, a pocket TV set, etc. has been increasing rapidly. Liquid crystal display apparatuses of the reflection type have been particularly attracting much attention since they display an image by reflecting the incident light from outside and do not require a back light. As a result, the power consumption is low and the apparatus can be made to be thin and light-weight.

Conventionally, TN (Twisted Nematic) mode and STN (Super Twisted Nematic) mode are employed in the reflection type liquid crystal display apparatus. Since these modes require a polarizing plate, one half of the light intensity of the natural light is inevitably not used for display and, therefore, the display becomes dark.

In order to overcome this problem, display modes in which all of the natural light beams are effectively used have been suggested. An example of such display modes is phase transition type guest-host mode (D. L. White and G. N. Taylor: J. Appl. Phys. Vol. 45, pp. 4718, 1974; referred to as White publication hereinafter). In this display mode, a cholesteric-nematic phase transition phenomenon by electric field is used. Also suggested is a reflection type multi-color display where micro color filters are incorporated in the phase transition type guest-host mode (for example, refer to Tohru Koizumi and Tatsuo Uchida. Proceedings of the SID. Vol. 29/2, pp. 157. 1988).

In order to obtain a brighter display in such display modes which do not require the polarizing plate, it is necessary to increase the intensity of the incident light scattering in the direction perpendicular to the display screen for all incident angles. To accomplish such, it is necessary to produce a reflecting plate having optimal reflecting characteristics. In the above-mentioned White publication, a description is provided to obtain such a reflecting plate as follows. The surface of a substrate made of glass or the like is roughed by a grinding agent. Then, after a certain period of time, the substrate is etched via hydrofluoric acid to form an uneven surface, and then a thin film of silver is formed on the uneven surface.

However, since the uneven surface is formed by scraping the glass substrate with the grinding agent, it is difficult to form a uniform uneven surface. Reproducibility in consistently forming the uneven surface is also poor.

FIG. 21A is a plan view of a matrix substrate 2 having thin film transistors 1 (referred to as TFT hereinafter) which are switching devices used in the active matrix mode, and FIG. 21B is a cross-sectional view of the matrix substrate 2 illustrated in FIG. 21A taken along the B—B line. The matrix substrate includes a plurality of gate bus lines 3 made of chromium, tantalum or the like provided in parallel to each other on the insulating matrix substrate 2 made of glass or the like, and a gate electrode 4 which is branched from the gate bus line 3. The gate bus line 3 functions as a scanning line.

As illustrated in FIG. 21B, a gate insulating film 5 made of silicon nitride ($SiN_x$), silicon oxide ($SiO_x$) or the like is formed on the entire surface of the substrate $2a$, covering the gate electrode 4. Formed on the portion of the gate insulating film 5 on the gate electrode 4 is a semiconductor layer 6 which is made of amorphous silicon (referred to as a-Si hereinafter), polycrystalline silicon, CdSe, etc. Formed on both sides of the semiconductor layer 6 are $n^+$- or $p^+$-contact layers 11 made of a-Si, polycrystalline silicon, CdSe, etc. Furthermore, as illustrated in FIG. 22, the gate insulating film 5 is formed on the entire surface of the substrate $2a$ except the portions on the input terminals $3a$ of the gate bus lines 3.

As illustrated in FIG. 21B, a source electrode 7 made of titanium, molybdenum, aluminum, etc. is formed and stacked on one side of the semiconductor layer 6. Formed and stacked on the other side of the semiconductor layer 6 is a drain electrode 8 which is also made of titanium, molybdenum, aluminum, etc. in a similar manner as the source electrode 7. A pixel electrode 9 made of a transparent conductive film such as ITO (Indium Tin Oxide) is formed and stacked at the edge of the drain electrode 8 opposite to the semiconductor layer 6.

As illustrated in FIGS. 21A and 21B, a source bus line 10 which crosses the gate bus line 3 with the gate insulating film 5 interposed therebetween is connected to the source electrode 7. The source bus line 10 functions as a signal line. The source bus line 10 is also formed of a similar metal as the source electrode 7. The gate electrode 4, the gate insulating film 5, the semiconductor layer 6, the source electrode 7 and the drain electrode 8 constitute the TFT 1, which has a function as a switching device.

When the matrix substrate 2 having TFTs 1 as illustrated in FIGS. 21A, 21B and 22 is applied to a reflection type liquid crystal display apparatus, it is necessary to form the pixel electrodes 9 of a metal having a light reflecting property such as aluminum, silver, etc. and to form the uneven surface on the gate insulating film 5. Generally, it is not desirable to form the uneven surface on the gate insulating film 5 since it has negative effects on the device forming processes. Furthermore, it is difficult to uniformly form the tapered uneven surface on the insulating film 5 which is made of an inorganic material.

Japanese Laid-Open Patent Publication No. 56-94386 to Yazawa et al. (referred to as Yazawa publication 1 hereinafter) discloses a method for increasing the intensity of light scattering in the direction perpendicular to the display screen, where a metal thin film layer having an uneven surface is used as a reflecting plate of a liquid crystal display apparatus, and also describes methods for producing the metal thin film layer listed as (1), (2) and (3) below.

(1) A method where a metal thin film layer is formed on the substrate by evaporation or sputtering under a particular condition, and a metal thin film having an uneven surface is obtained.

(2) A method where a metal thin film layer formed on the substrate by evaporation or sputtering is subjected to heat treatment and recrystallization to obtain a metal thin film layer having an uneven surface. For example, when aluminum or aluminum alloy is used as a material for the metal thin film layer, since the melting point of the material is 660° C., the recrystallization is carried out in the temperature range of 100° C. to 600° C. This recrystalization is responsible for the rearrangement of atoms within the metal thin film, which results in the metal thin film layer having an uneven surface.

(3) A method where, as illustrated in FIG. 23, an alloy thin film layer 63 formed on the substrate 2 by evaporation or sputtering is subjected to heat treatment so that precipitations 64 precipitate, and then the portion of the alloy thin film layer 63 proximate to the surface is removed by etching. For example, when the alloy thin film layer 63 obtained by mixing 2% weight of silicon in aluminum is heated in a $N_2$ environment at 400° C. for 20 minutes, an intermetallic compound of aluminum and silicon having a particle diameter of about 0.2 to 1.0 $\mu$m precipitates as the precipitation 64. For example, when the alloy thin film layer 63 of 1.0 $\mu$m thickness is subjected to precipitation treatment and then the 0.2 $\mu$m portion from the surface of the layer is removed by etching, the surface becomes white.

Also described in Yazawa publication 1 is that the surface of the metal thin film layer can be treated by sand blasting. Further described in the publication is that since the uneven surface and the steps on the surface of the metal thin film layer have some negative effect when forming an aligning treatment film, a transparent thin film such as an organic thin film made of a silicone resin, an epoxy resin, a polyimide resin or the like or an inorganic resin can be formed on the surface of the liquid crystal driving electrodes (pixel electrodes) so as to flatten the surface, thereby enhancing the effect of the aligning treatment.

However, the method for forming the reflecting plate disclosed in the above-mentioned Yazawa publication 1 depends largely on a chance factor. Like the reflecting plate described in the above-mentioned White publication (the formation of the reflecting plate includes roughening the surface of the substrate made of glass or the like by the grinding agent, etching the substrate via hydrofluoric acid after a certain period of time to form the uneven surface, and forming the thin film of silver on the uneven surface), it is difficult to uniformly form the tapered unevenness.

Furthermore, the fact that the reflecting plate is white means that light reflecting on the reflecting plate scatters in all directions. When the reflecting plate also functions as the liquid crystal driving electrode of the liquid crystal display apparatus and is formed on the substrate surface which is in contact with the liquid crystal, light from the reflecting plate gets out to the atmosphere through the liquid crystal layer and the opposing substrate. When the refractive index of the liquid crystal layer and the substrate is assumed to be 1.5 and the refractive index of the air to be 1, if the scattered light from the reflecting plate is incident on the interface between the atmosphere and the substrate with an angle from the vertical of more than about 48°, then the scattered light is reflected at the interface and cannot get outside of the liquid crystal display apparatus. Therefore, if such a reflecting plate is used, the portion of the dispersed light which can be used as the light for display becomes limited and the display screen becomes dark. Therefore, in order to obtain a brighter display screen, it is necessary that the reflecting plate has directionality so that it can control the scattering angle of the reflected light. However, as described above, it is considerably difficult to control the scattering angle of the reflected light from the reflecting plate in the methods described in Yazawa publication 1 and White publication because of the chance factor on which the formation of the reflecting plate largely depends. It is also difficult to achieve better reproducibility.

Japanese Laid-Open Patent Publication No. 56-156864 to Yazawa et al. (referred to as Yazawa publication 2 hereinafter) describes with regards to the reflection characteristics of the reflecting plate formed by heating aluminum or aluminum alloy, that even if the reflecting plate formed by subjecting the aluminum to heat treatment in an inert gas environment or a hydrogen gas environment at 400° C. to 450° C. is used, since the ratio of the mirror surface portion is large, the entire display panel becomes dark. Consequently, in order to increase the intensity of the light scattering in the desired direction, it is necessary to perform the heat treatment at higher temperatures. However, such heat treatment is not desirable because it destroys the TFT devices or MIM devices used as switching devices (for example, in the case of a-Si*TFT, dehydrogenation in the semiconductor layer begins at 350° C.).

Yazawa publication 2 describes a method for forming a reflecting plate at a low temperature having directionality which controls the scattering angle of the reflected light, so that it can be used in an active matrix type liquid crystal display apparatus where a-Si*TFT devices or MIM devices are used as switching devices. According to this method, $SiO_2$ is first formed on the substrate surface in a triangular wave-shape by CVD, and then aluminum is deposited thereon to form a reflecting plate 65 as illustrated in FIG. 24. The reflecting plate 65 has a cross-section of a near sinusoidal wave-shape with the mean slope angle of $\theta=5°$ to 30°.

Japanese Laid-Open Patent Publication No. 56-156865 to Yazawa et al. (referred to as Yazawa publication 3 hereinafter) describes that when a reflecting plate obtained by subjecting the aluminum or the aluminum alloy to heat treatment and then optionally by etching is used in the liquid crystal display apparatus, the display characteristics of the display apparatus become degraded. In order to cope with this problem, it is disclosed in Yazawa publication 3 that the reflecting plate 66 having the uneven surface as illustrated in FIG. 25 is formed by performing taper-etching on the $SiO_2$ formed by CVD in a triangular wave-shape and then by depositing aluminum thereon.

To form a reflecting plate by forming a metal thin film on an insulating resin layer having an uneven surface, the method described below has been suggested.

U.S. Pat. No. 4,519,678 to Komatsubara et al. (referred to as Komatsubara publication hereinafter) discloses the following method. First, a polymer based (for example, polyimide based) resin is applied onto the substrate having devices formed thereon and then the resin is thermally cured to form a resin layer. Then, a resist pattern is formed thereon by photolithography, which is then used as a mask when performing wet-etching or dry-etching (RIE, etc.) so that indentations are formed on the resin layer. Then, after removing the resist pattern, the resin layer is heated at 150° C. to 500° C. so as to smooth the edges, peaks, and/or valleys of the indentation. After forming the uneven surface as described above which has a smooth cross-section and further forming a contact hole by photolithography, aluminum is deposited on the resin layer by vacuum evaporation, thereby forming the reflecting plate.

Another method is also described in the Komatsubara publication. A plurality of cylinder-shape protrusions are formed on the substrate and then a resin layer is applied thereon and cured so that the resin layer of which the cross-section thereof has a smooth uneven surface is formed. Then, a reflecting plate made of aluminum, silver, an alloy thereof or the like are formed on the resin layer. The above-mentioned cylinder-shape protrusion is formed by forming on the substrate a single layer or a plurality of layers of insulator, semiconductor or metal and by selectively etching the layer(s) using a mask pattern (a resist). In either case, the metal thin film which is formed on the resin layer is in electrical contact with the electrode on the substrate via the contact hole formed in the pesin layer.

Japanese Laid-Open Patent Publication No. 6-75238 to Nakamura et al. describes that a reflecting plate made of a metal thin film is formed on an insulating film by applying a photosensitive resin on the substrate, by exposing and developing the photosensitive resin with light blocking means including circular light blocking regions, and by performing heat treatment so that a plurality of protrusions are formed, and then by forming an insulating film on the plurality of protrusions along the protrusion-shape of the protrusions.

As described above, it is preferable to produce the reflecting plate by forming a desired uneven surface with an insulating film interposed therebetween, which is far from the devices (close to the interface with the liquid crystal), so that the devices formed on the substrate are not affected. When producing the reflecting plate, it is more desirable to form the insulating layer having an uneven surface under the metal thin film and then to form the metal thin film in a mirror-surface condition along the uneven surface than to treat (heat treatment, etching, etc.) the surface of the metal thin film itself to be used as the reflecting plate. Furthermore, since it is difficult to realize a uniform uneven surface having a smooth cross-section in the insulating layer made of an inorganic material, it is preferable to form the insulating layer by using a resin which can easily be controlled for producing the uneven surface.

When a resin layer is used to form a reflecting plate having desirable reflection characteristics (directionality), it is necessary to form a contact hole which connects the reflecting plate (reflecting electrode) formed on the resin layer to the device (switching device, etc.) formed under the resin layer. The reflecting electrode is connected via the contact hole to a drawing-out electrode extending from the device formed on the substrate. The drawing-out electrode mentioned here is an electrode for applying voltage for displaying to each reflecting electrode.

The contact hole is formed by photolithography after thermally curing the resin layer when a non-photosensitive resin is to be used. When a photosensitive resin is to be used, it is formed when the resin layer is formed by exposure and development. It is advantageous to use the photosensitive resin because of the fewer number of steps.

When the resin layer is formed of a photosensitive resin, the thickness of the resin layer decreases due to the development even if it is the portion to be selectively left by exposure and development. Therefore, the effect of the development time when forming the uneven surface having smooth cross-section on the resin layer is large. On the other hand, the longer the development time, the better the continuity of the contact hole becomes.

The developing speed for the resin layer within the substrate is faster on the periphery of the substrate than in the central region. Therefore, when the reflecting plate is formed by using a large substrate of 300×300 mm or greater (e.g., if the development is performed for a sufficient time to obtain excellent continuity of a contact hole in the central region of the substrate), then the periphery of the substrate becomes excessively developed and the reflecting plate becomes more of a mirror-like condition. For this reason, a liquid crystal display apparatus utilizing the reflecting plate formed at the peripheral portion of the substrate tends to have a darker display.

When the contact hole is formed by dry-etching, for example, by RIE, using a non-photosensitive resin such as the one described on the above-mentioned Komatsubara publication, because the plasma of the dry-etching is of high density in the central region of the substrate, the etching proceeds from the center of the substrate. Since both the resist which is used as a mask pattern and the resin are an organic film, it is difficult to have the selection ratio thereof to be greater than 10. Therefore, if the etching is carried out in such a manner that sufficient continuity of the contact hole is obtained on the peripheral region of the substrate, then the resist is excessively etched in the central region of the substrate and, as a result, the contact hole becomes too large and the film thickness of the resin decreases. For this reason, a liquid crystal display apparatus utilizing the reflecting plate formed in the central region of the substrate has darker display.

Moreover, the thickness of the liquid crystal layer in a liquid crystal display apparatus and the gap between a pair of substrates before injecting liquid crystal (referred to as the cell gap hereinafter) are important parameters affecting the response time, the contrast, etc. of a liquid crystal display apparatus. Therefore, it is important in view of production control of liquid crystal display apparatuses to measure the thickness of the liquid crystal layer, the cell gap, etc.

Conventionally, in the case of a transmission type liquid crystal display apparatus or a reflection type liquid crystal display apparatus having the reflecting plate on the outside of a pair of substrates, the cell gap was measured by using the interference of two kinds of reflected light with the liquid crystal cell being in a transmission condition, one from the interface between the alignment film of one of the substrate and the liquid crystal layer or the air layer and the other from the interface between the liquid crystal layer or the air layer and the alignment film of the other substrate. However, in a reflection type liquid crystal display apparatus having the reflecting plate formed inside of a pair of substrate as a pixel electrode, since the intensity of the scattered reflection light from the reflecting electrode is too large, the measurement of the wavelength of the interference light is difficult and the conventional measurement method utilizing the interference of light cannot be used.

There is another method for measuring the cell gap which uses laser light. This method, the outline of which is illustrated in FIG. 26, uses an optical system including a first lens 17a which collimates laser light from the semiconductor laser 19 into parallel light and a second lens 17b which collects laser light reflected at the sample 18 to be measured. The method is based on the fact that when the focal point of the second lens 17b is on the reflection surface (e.g., the interface between the alignment film and the liquid crystal layer, or the surface of the reflecting electrode, etc.) of the sample 18, the reflected light which is fed back to the system reaches its peak. The locations of the second lens 17b corresponding to the peaks of the two reflected lights (i.e., the distance traveled by the lens) can be used to calculate the interval between the two reflection surfaces.

FIG. 27 illustrates the result of the measurement by this method made on the surface of the reflecting electrode having the uneven surface formed thereon to obtain desired scattered light. As can be seen from FIG. 27, since the laser light scatters at the reflecting electrode having the uneven surface, the peak of the reflected light cannot be obtained. Therefore, the location of the reflecting plate cannot be determined by the measurement using laser light, which makes the measurement of the cell gap impossible.

The formation of the contact hole and its continuity are an important problem in the transmission type liquid crystal display apparatus as well as in the reflection type liquid crystal display apparatus. Problems associated with conventional liquid crystal display apparatuses will further be described.

FIG. 28 is a schematic cross-sectional view of a conventional liquid crystal display apparatus 200, and FIG. 29 is a schematic plan view of an active matrix substrate 201 of the liquid crystal display apparatus 200 illustrated in FIG. 28. As illustrated in FIG. 28, the liquid crystal display apparatus 200 includes an active matrix substrate 201, an opposing substrate 202 and a liquid crystal layer 35 held between the two substrates. The active matrix substrate 201 includes a glass substrate 21, and driving signal lines 30, pixel electrodes 27 and driving devices 29 (switching devices) formed on the glass substrate 21, and the opposing substrate 202 includes a substrate 38, and an opposing electrode 36 and color filters 37 formed on the substrate 38.

As illustrated in FIG. 29, the pixel electrodes 27 are arranged in a matrix configuration on the active matrix substrate 201, and each pixel electrode 27 is connected to the driving signal line 30 via a corresponding driving device 29. This liquid crystal display apparatus 200 uses a diode type two-terminal device as the driving device 29.

FIG. 30A is a schematic plan view illustrating a region of the active matrix substrate 201 corresponding to one pixel, and FIG. 30B is a schematic cross-sectional view of the substrate in FIG. 30A taken along the line B—B. With reference to FIGS. 30A and 30B, the structure proximate to the driving device 29 will be described.

As illustrated in FIG. 30A, the driving signal line 30 has a branch, and this branch serves as a lower electrode 22 of the driving device 29. As illustrated FIGS. 30A and 30B, the lower electrode 22 is formed on the glass substrate 21 at the location of the driving device 29, and an insulating film 23 is formed thereon. Patterned and formed on the insulating film 23 is an upper electrode 24. As described above, the diode type two-terminal device 29 having the lower electrode 22, the insulating film 23 and the upper electrode 24 is constructed. An insulating protective film 26 is formed on the entire surface of the glass substrate 21 so as to cover the driving devices 29. Patterned and formed on the insulating protective film 26 is the pixel electrode 27. The pixel electrode 27 is electrically connected to the upper electrode 24 of the driving device 29 via the contact hole 28 provided in the insulating protective film 26.

When an inorganic insulating film or a thermosetting resinous material is used for the insulating protective film 26, another process such as photolithography is necessary in order to form the contact hole 28 by patterning. When a photosensitive resinous material is used for the insulating protective film 26, the processes can be simplified because the contact hole 28 can be formed by exposure and development. However, when the insulating protective film 26 is formed of the photosensitive resinous material, if the development residue of the photosensitive resinous material occurs inside the contact hole 28, then a good contact cannot be obtained between the pixel electrode 27 and the upper electrode 24. If a pixel defect due to poor contact resulting from such development residue of the insulating protective film 26 occurs, a display quality of the liquid crystal display apparatus becomes deteriorated.

As described above, liquid crystal display apparatuses having excellent continuity of the contact hole and excellent image characteristics are in demand. Furthermore, as to a reflection type liquid crystal display apparatus having the reflecting plate formed inside the pair of substrates as the pixel electrode, a liquid crystal display apparatus capable of having the cell gap be measured and having excellent production efficiency as well as having excellent continuity of the contact hole (i.e., excellent image characteristics) is desired.

SUMMARY OF THE INVENTION

According to one aspect of the present invention, a reflection type liquid crystal display apparatus includes: a first substrate having a plurality of reflecting electrodes; a second substrate having a light transmitting electrode; and a liquid crystal layer disposed between the first substrate and the second substrate. The first substrate includes an insulating substrate, a switching device provided on the insulating substrate for supplying a display voltage signal to the reflecting electrode, a drawing-out electrode connected to the switching device and extending under the reflecting electrode, and an insulating resin layer having a contact hole on the drawing-out electrode; the reflecting electrode is provided on the insulating resin layer, corresponding to each pixel, so as to cover the contact hole, and is electrically connected to the drawing-out electrode at the bottom of the contact hole; the drawing-out electrode has at least two different metal layers in a region larger than a bottom of the contact hole, the region including the bottom of the contact hole; and a metal layer which is an uppermost layer of the drawing-out electrode is removed at the bottom of the contact hole in the direction of a thickness either partially or until an underlying metal layer is reached.

In one embodiment of the present invention, an opening area of the contact hole formed in the insulating resin layer is 400 $\mu m^2$ or more and 8% or less of the area of the reflecting electrode.

In one embodiment of the present invention, the switching device is a thin film transistor; a lower metal layer formed on a portion of the drawing-out electrode at the contact hole is formed of the same material as a gate electrode of the thin film transistor; and an upper metal layer of the drawing-out electrode is formed of the same material as a source electrode of the thin film transistor.

In one embodiment of the present invention, the lower metal layer formed on a portion of the drawing-out electrode at the contact hole is made of a material selected from the group consisting of tantalum, tantalum containing 50 atomic % or less of nitrogen and tantalum containing molybdenum, and the upper metal layer is made of titanium.

In one embodiment of the present invention, the switching device is a MIM (Metal-Insulator-Metal) device; a lower metal layer formed on a portion of the drawing-out electrode at the contact hole is formed of the same material as a first electrode of the MIM device; and an upper metal layer of the drawing-out electrode is formed of the same material as a second electrode of the MIM device.

In one embodiment of the present invention, the lower metal layer formed on a portion of the drawing-out electrode at the contact hole is made of a material selected from the group consisting of tantalum, tantalum containing 50 atomic % or less of nitrogen, tantalum containing 10 atomic % or less of silicon and tungsten, and tantalum containing 10 atomic % or less of one or more elements having valance of four or less and 10 atomic % or less of one or more elements having valance of six or greater, and the upper metal layer of the drawing-out electrode is made of titanium.

In one embodiment of the present invention, the insulating resin layer has an uneven surface in a region where the reflecting electrode is formed.

In one embodiment of the present invention, the uneven surface is formed except in a region of the contact hole.

In one embodiment of the present invention, the reflecting electrode is formed so as to have a mirror surface at a bottom of the contact hole.

In another aspect of the present invention, a method for producing a reflection type liquid crystal display apparatus including a first substrate having a plurality of reflecting electrodes, a second substrate having a light transmitting electrode, and a liquid crystal layer disposed between the first substrate and the second substrate, includes the steps of: forming a switching device on an insulating substrate for supplying a display voltage signal to the reflecting electrode; forming a drawing-out electrode connected to the switching device and extending under the reflecting electrode, the drawing-out electrode having at least two different metal layers in at least one region; forming an insulating resin layer over the switching device and the drawing-out electrode; forming a contact hole in a portion of the insulating resin layer on a region where the metal layers of the drawing-out electrode are formed; performing etching on a metal layer which is an uppermost layer of the drawing-out electrode by using an etchant, so that the uppermost layer at the bottom of the contact hole is removed at least partially in the direction of a thickness until an underlying metal layer is reached; and forming a reflecting electrode on the insulating resin layer, corresponding to each pixel, so as to cover the contact hole.

In one embodiment of the present invention, an opening area of the contact hole is 400 $\mu m^2$ or more and 8% or less of an area of the reflecting electrode.

In one embodiment of the present invention, the switching device is a thin film transistor; a lower metal layer of the drawing-out electrode is formed of the same material as a gate electrode of the thin film transistor; and an upper metal layer of the drawing-out electrode is formed of the same material as a source electrode of the thin film transistor.

In one embodiment of the present invention, in the step of forming the drawing-out electrode, the lower metal layer is formed of a material selected from the group consisting of tantalum, tantalum containing 50 atomic % or less of nitrogen, and tantalum containing molybdenum, and the upper metal layer is formed of titanium.

In one embodiment of the present invention, the switching device is an MIM device; a lower metal layer of the drawing-out electrode is formed of the same material as a first electrode of the MIM device; and an upper metal layer of the drawing-out electrode is formed of the same material as a second electrode of the MIM device.

In one embodiment of the present invention, the lower metal layer is formed of a material selected from the group consisting of tantalum, tantalum containing 50 atomic % or less of nitrogen, tantalum containing 10 atomic % or less of silicon and tungsten, and tantalum containing 10 atomic % or less of one or more elements having valance of four or less and 10 atomic % or less of one or more elements having valance of six or greater, and the upper metal layer is formed of titanium.

In one embodiment of the present invention, the step of forming the insulating resin layer includes the steps of: forming a protrusion pattern made of an insulating resin in a region where the reflecting electrode is formed exclusive of a region where the contact hole is formed; and forming a second insulating resin layer on the protrusion pattern by applying the same insulating resin. The contact hole is formed in the second insulating resin layer.

In one embodiment of the present invention, the etchant is a mixture containing hydrogen fluoride of a concentration of 0.25% to 1.00%.

In one embodiment of the present invention, the reflecting electrode formed on the insulating resin layer has a scattering property, and the reflecting electrode is formed so that a portion thereof at the bottom of the contact hole has a mirror surface.

In one embodiment of the present invention, the method for producing a reflection type liquid crystal display apparatus further includes the step of measuring a thickness of the liquid crystal layer by using light reflected at a portion of the reflecting electrode having a mirror surface at the bottom of the contact hole.

According to still another aspect of the present invention, an active matrix substrate includes an insulating substrate, a switching device disposed on the insulating substrate and having at least two electrodes, an insulating protective film formed so as to cover the switching device and having a contact hole, and a pixel electrode formed on the insulating protective film and electrically connected to the switching device through the contact hole. The active matrix substrate has at least two different conductive layers including a conductive layer extending from one of at least two electrodes of the switching device under the insulating protective film in a region where the contact hole is formed.

In one embodiment of the present invention, the one of the electrodes of the switching device has a stacked layer structure including at least two different conductive layers which are simultaneously patterned.

In one embodiment of the present invention, the insulating protective film is formed of a photosensitive resinous material.

In one embodiment of the present invention, the conductive layer extending from the one of the electrodes is located as the lowermost layer of the at least two conductive layers.

In one embodiment of the present invention, at least the two conductive layers do not include a metal layer which forms another electrode of the switching device.

In one embodiment of the present invention, a liquid crystal display apparatus includes the active matrix substrate, an opposing substrate, and a liquid crystal layer held between the active matrix substrate and the opposing substrate.

According to still another aspect of the present invention, a method for producing an active matrix substrate including an insulating substrate, a switching device disposed on the insulating substrate and having at least a first electrode and a second electrode, an insulating protective film formed so as to cover the switching device and having a contact hole, and a pixel electrode electrically connected to the switching device through the contact hole, includes the steps of: forming on the insulating substrate a driving signal line and a first electrode connected to the driving line; forming an insulating film on the first electrode; forming a second electrode stacked on the insulating film and having an extending portion; forming a conductive layer in a predetermined region of the extending portion; forming an insulating protective film covering the entire surface of the insulating substrate and having the contact hole on the conductive layer; performing etching so that at least surface portion of the conductive layer within the contact hole is removed; and patterning and forming the pixel electrode electrically connected to the switching device through the contact hole on the insulating protective film.

In one embodiment of the present invention, the step of forming the conductive layer is performed together with the step of forming the second electrode, thereby performing simultaneously patterning the conductive layer and the second electrode.

In one embodiment of the present invention, the insulating protective film is formed of a photosensitive resinous material.

In one embodiment of the present invention, the etching step is performed by using the insulating protective film having the contact hole as a mask.

In one embodiment of the present invention, the method for producing an active matrix substrate further includes the step of forming an external connection terminal connected to the driving signal line. In the step of forming the conductive layer, a connection auxiliary conductive layer is formed on the external connection terminal at the same time.

Thus, the invention described herein makes possible the advantages of (1) providing a liquid crystal display apparatus having excellent continuity of the contact hole and excellent image characteristics, (2) providing a reflection type liquid crystal display apparatus capable of having the cell gap be measured and having excellent production efficiency, (3) providing a reflection-type liquid crystal display apparatus having excellent reflection characteristics (for example, brightness, deviation, etc.), (4) providing an active matrix substrate which can realize such liquid crystal display apparatuses, and (5) providing a simple method for producing such liquid crystal display apparatuses and active matrix substrates.

These and other advantages of the present invention will become apparent to those skilled in the art upon reading and understanding the following detailed description with reference to the accompanying figures.

BRIEF DESCRIPTION OF THE DRAWINGS

FIGS. 10A to 10F are schematic cross-sectional views illustrating another method for producing a liquid crystal display apparatus of the present invention.

FIG. 19 is a plan view illustrating an overall structure of the active matrix substrate shown in FIG. 18.

DESCRIPTION OF THE PREFERRED EMBODIMENTS

Embodiments

Hereinafter, the present invention will be specifically described by way of embodiments. However, the present invention is not limited to these embodiments.

(Embodiment 1)

Figure 1:
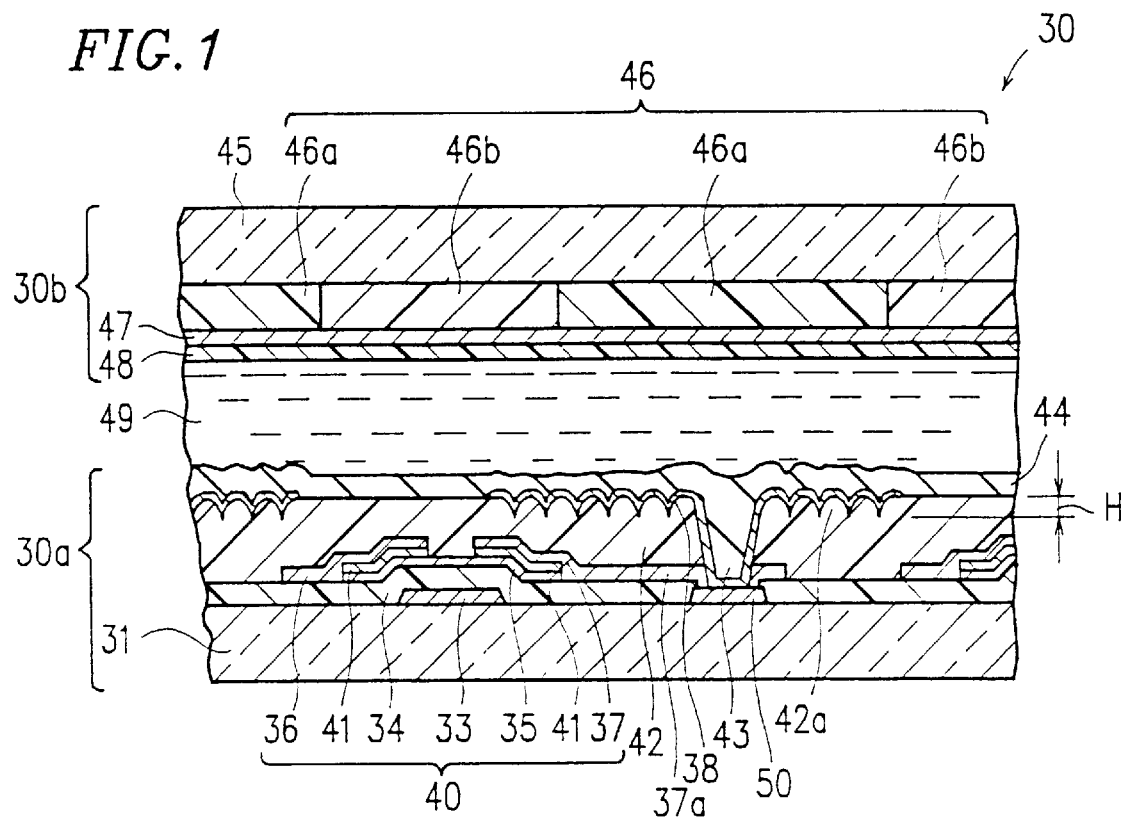
FIG. 1 is a schematic partial cross-sectional view illustrating an exemplary embodiment of a liquid crystal display apparatus of the present invention.
Figure 2:
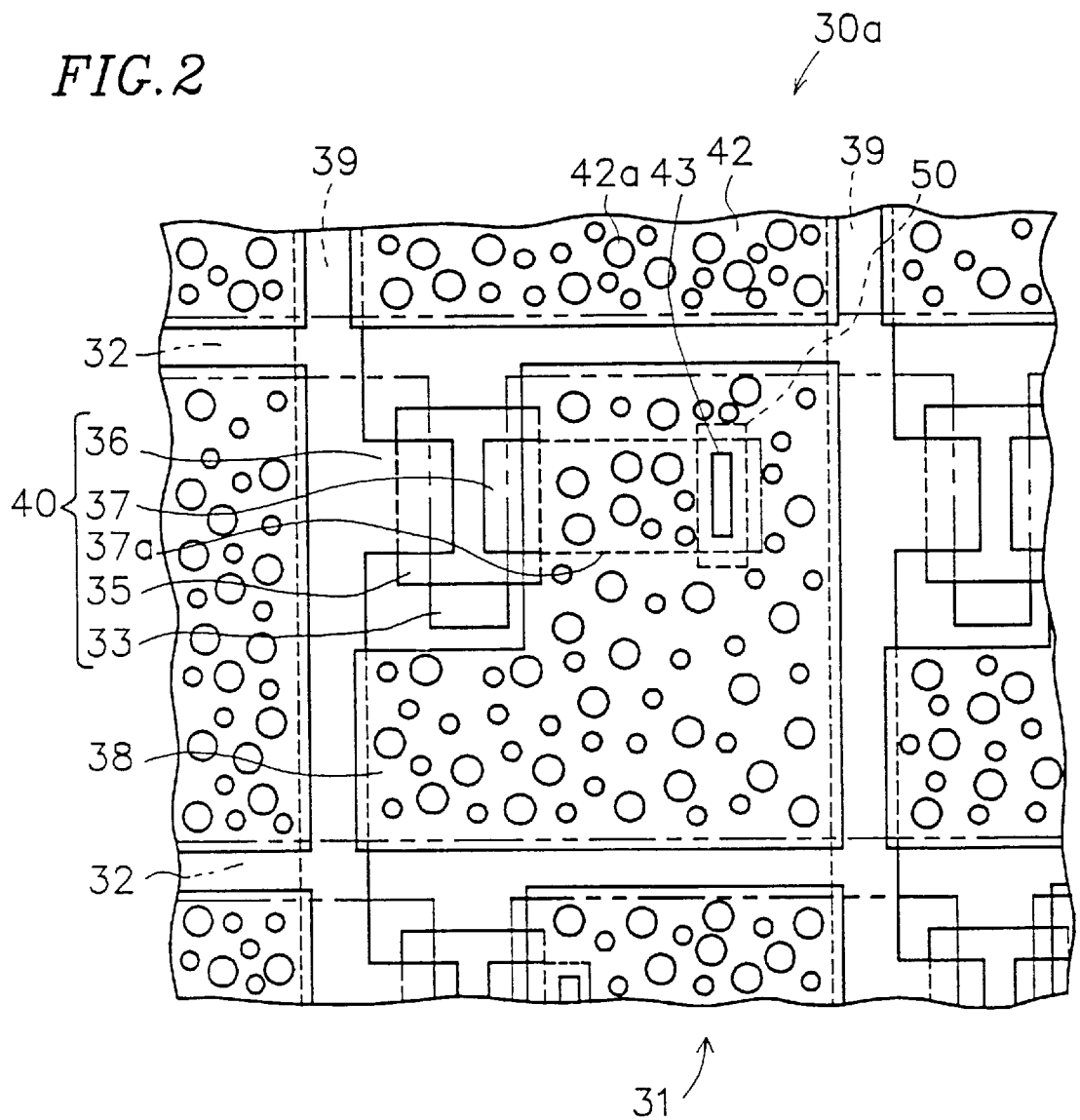
FIG. 2 is a schematic plan view of the active matrix substrate illustrated in FIG. 1.

FIG. 1 is a schematic partial cross-sectional view illustrating a preferred embodiment of a reflection type liquid crystal display apparatus of the present invention. A liquid crystal display apparatus 30 has a lower substrate 30a (active matrix substrate) having switching devices (TFTs) formed thereon, an upper substrate 30b (opposing substrate) and a liquid crystal layer 49 held between the two substrates. FIG. 2 is a schematic plan view of the active matrix substrate 30a illustrated in FIG. 1.

First, the active matrix substrate 30a will be described. As illustrated in FIGS. 1 and 2, a plurality of gate bus lines 32 made of chromium, tantalum, etc. are formed in parallel to each other on an insulating substrate 31 made of glass or the like, and a gate electrode 33 is branched from the gate bus line 32. As a material for the gate bus line 32 and the gate electrode 33, tantalum containing less than 50 atomic % of nitrogen can be used. Tantalum containing molybdenum can also be used. The gate bus line 32 functions as a scanning line.

A gate insulating film 34 made of silicon nitride ($SiN_x$), silicon oxide ($SiO_x$), etc. is formed on the entire surface of the substrate 31 so as to cover the gate bus lines 32. As illustrated in FIGS. 1 and 2, a semiconductor layer 35 made of amorphous silicon (referred to as a-Si hereinafter), polycrystalline silicon, CdSe, etc. is formed over the gate electrode 33 with the gate insulating film 34 interposed therebetween. A contact layer 41 of $n^+$- or $p^+$-type made of a-Si, polycrystalline silicon, CdSe, etc. is formed on each end of the semiconductor layer 35.

A source electrode 36 made of titanium, molybdenum, aluminum, etc. is formed and stacked on one end of the semiconductor layer 35 on which the contact layer 41 is stacked. A drain electrode 37 and a drawing-out electrode 37a which are made of titanium, molybdenum, aluminum, etc. like the source electrode 36 are formed and stacked on the other end of the semiconductor layer 35 on which the contact layer 41 is stacked. The drain electrode 37 and the drawing-out electrode 37a can be integrally formed. The other end of the drawing-out electrode 37a is stacked on a pad 50 formed on the substrate 31. The pad 50 serves as a lower metal layer for the drawing-out electrode 37a at the location of the contact hole 43 and has an area at least greater than the contact hole 43. In the present embodiment, the pad 50 is formed of the same material as the gate electrode 33. Since the drawing-out electrode 37a becomes an upper metal layer at the location of the contact hole, a drawing-out electrode having at least two different kinds of metal layers is formed at the location of the contact hole.

Figure 22:
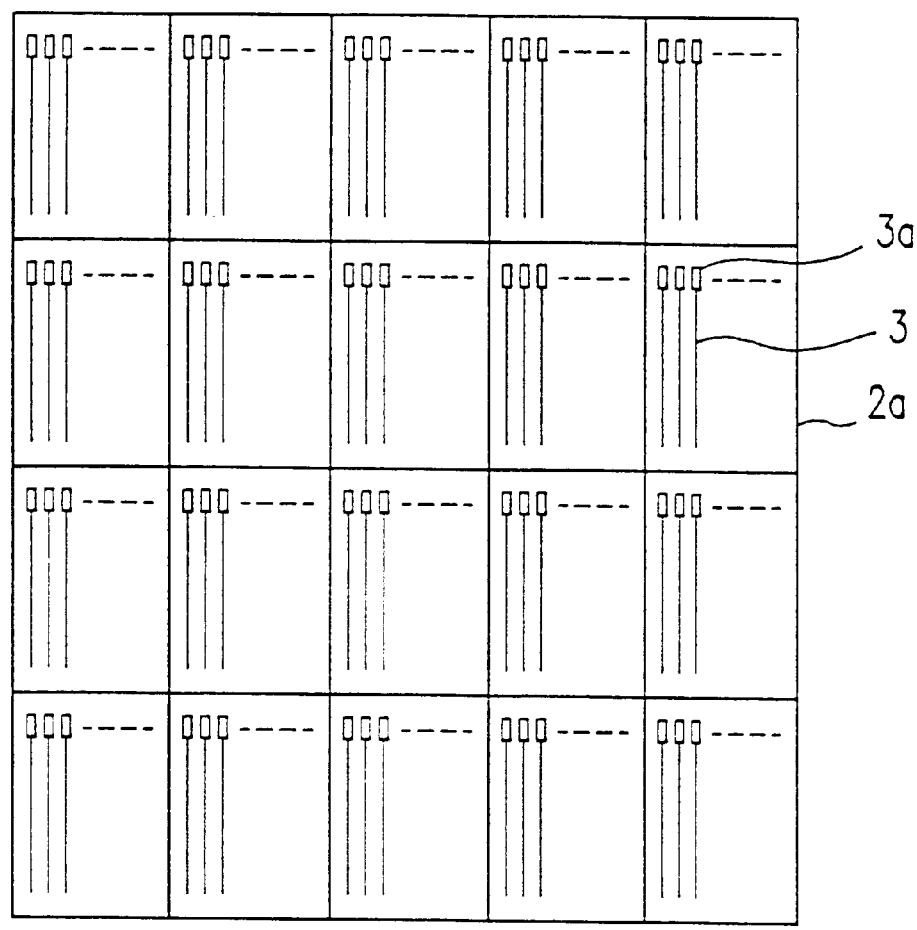
FIG. 22 is a schematic plan view of an entire active matrix substrate shown in FIGS. 21A and 21B.
Figure 23:
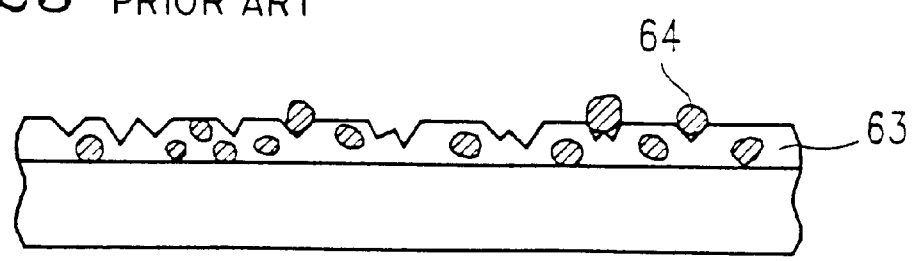
FIG. 23 is a schematic view illustrating a cross-section of a reflecting plate obtained by heating an aluminum alloy so that precipitations precipitate and then removing the precipitations by etching, of the conventional liquid crystal display apparatus.
Figure 24:
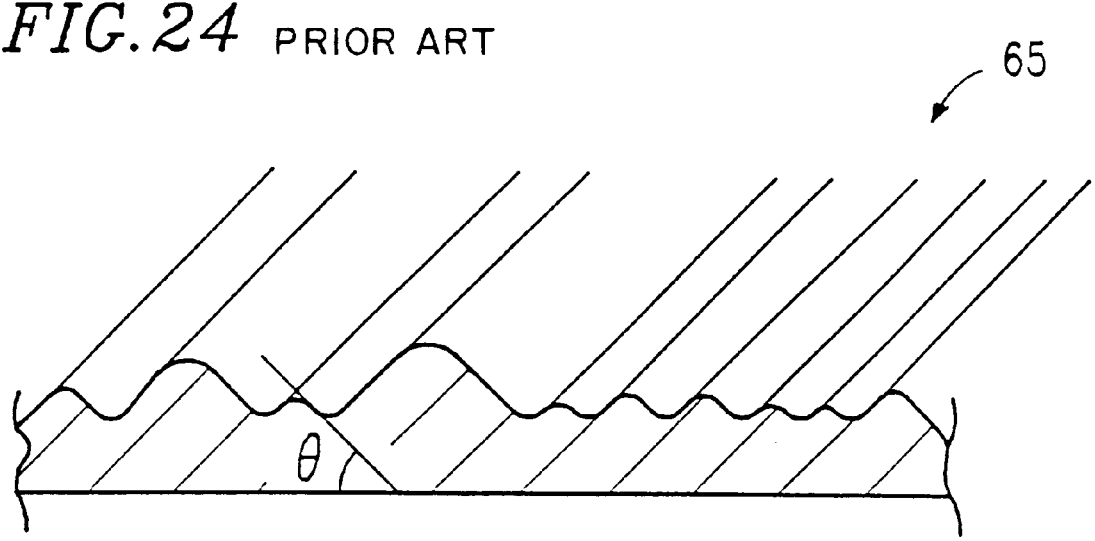
FIG. 24 is a schematic cross-sectional view illustrating an embodiment of a reflecting plate of the conventional liquid crystal display apparatus.
Figure 25:
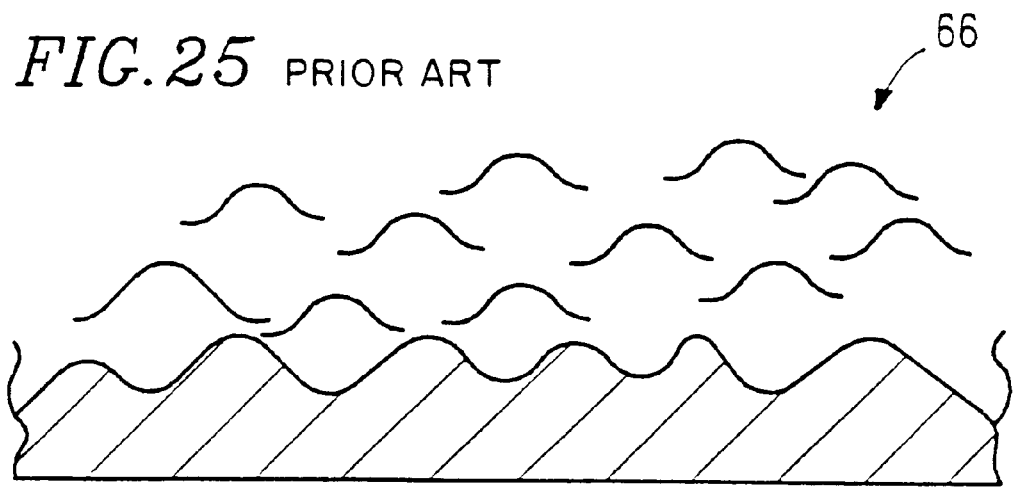
FIG. 25 is a schematic cross-sectional view illustrating another embodiment of a reflecting plate of the conventional liquid crystal display apparatus.
Figure 26:
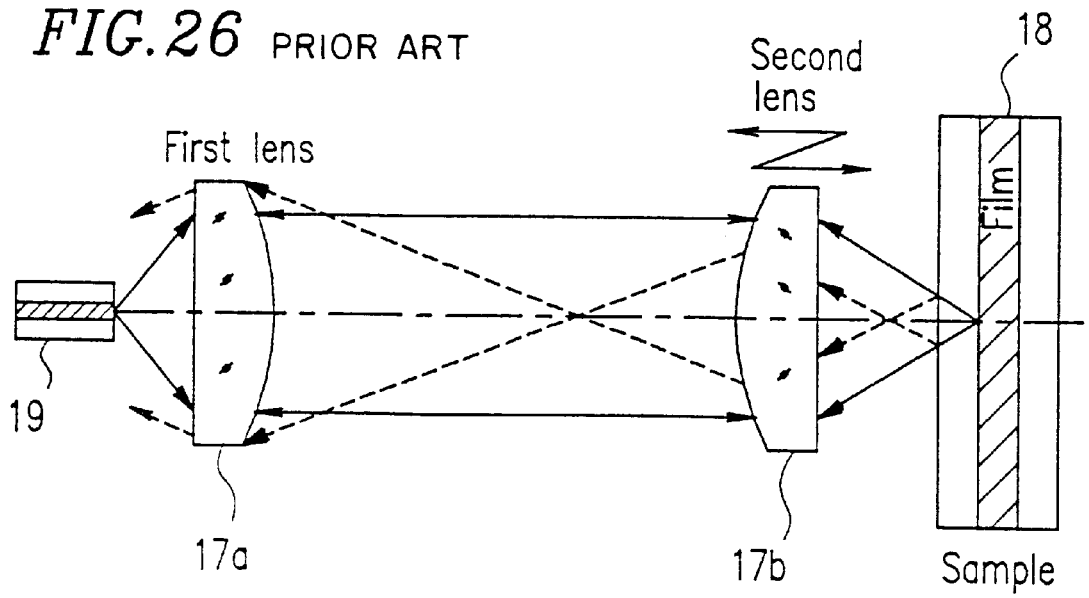
FIG. 26 is a schematic view illustrating an optical system for measuring a thickness of a liquid crystal layer of a liquid crystal display apparatus.
Figure 27:
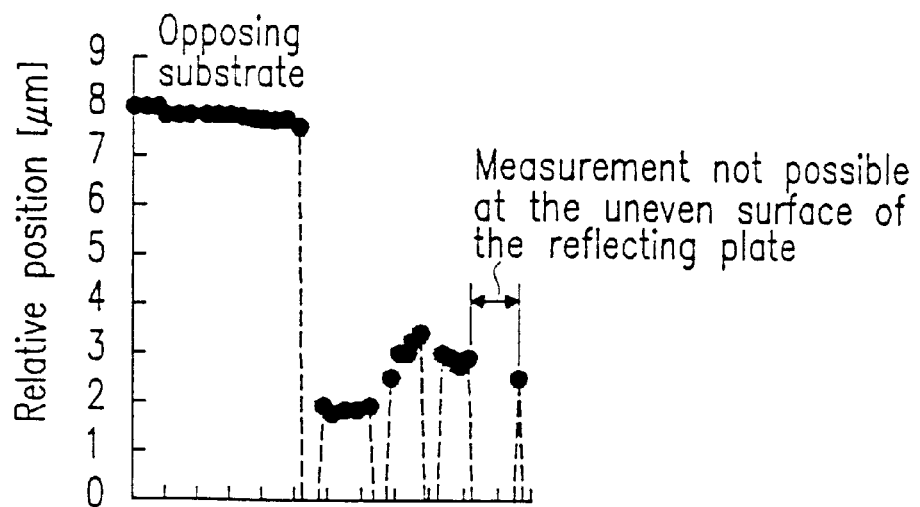
FIG. 27 is a diagram illustrating the result of a measurement on the thickness of the liquid crystal layer, using a reflecting plate having an uneven surface of the conventional reflection type liquid crystal display apparatus.
Figure 28:
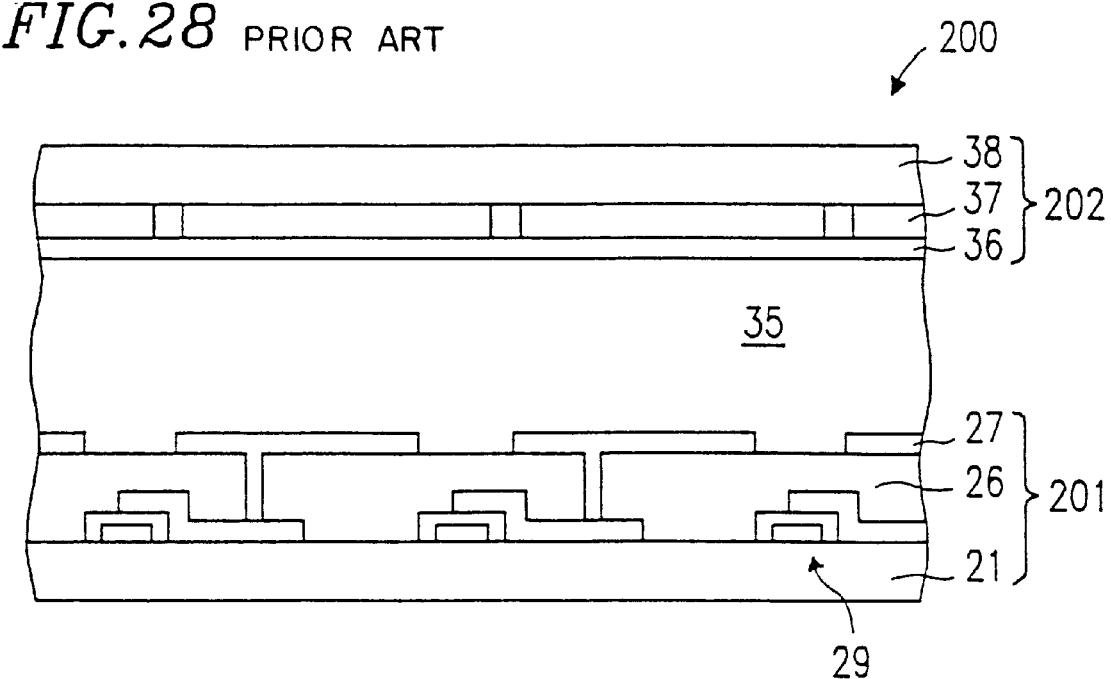
FIG. 28 is a schematic cross-sectional view of the conventional liquid crystal display apparatus.

As described with reference to the related art (FIG. 22), portions of the gate insulating film 34 above the input terminals of the gate bus lines 32 are removed. When these portions are removed, portions of the gate insulating film 34 above the pads 50 are also removed as illustrated in FIG. 2.

An a-Si TFT as the switching device 40 is formed of the gate electrode 33, the semiconductor layer 35, the source electrode 36 and the drain electrode 37.

An organic insulating film 42 is formed on the entire surface of the substrate 31 having switching devices formed thereon. The contact hole 43 is formed in the organic insulating film 42 at the location of the drawing-out electrode 37a. A plurality of protrusions 42a each of which has a tapered tip end, a circular cross-section at the tip and the height of H are formed in the region of the organic insulating film 42 where the reflecting electrode 38 (pixel electrode) is formed. It is preferable that the height H is less than about 10 μm so that they do not have a negative effect on the forming steps of the organic insulating film 42 or the contact hole 43 to be described later, and that the deviation of the cell gap when forming the liquid crystal display apparatus 30 becomes small.

The reflecting electrode 38 made of aluminum is formed on the organic insulating film 42 so as to cover both the region where the circular protrusions 42a are formed and the contact hole 43. The reflecting electrode 38 is connected to the drawing-out electrode 37a via the pad 50 at the contact hole 43.

As described above, in the reflection type liquid crystal display apparatus of the present invention, the drawing-out electrode 37a has at least two different kinds of metal layers (the upper metal layer and the lower metal layer in the present embodiment) in the region having a greater area than the bottom of the contact hole including the bottom of the contact hole 43. At the bottom of the contact hole, the uppermost metal layer (upper metal layer in the present embodiment) of the drawing-out electrode is removed in the direction of thickness either partially or until the metal layer (lower metal layer in the present embodiment) below is reached.

Next, a method for producing the reflection type liquid crystal display apparatus 30 will be described with an emphasis on a method for forming the active matrix substrate 30a.

First, devices such as the switching devices 40 or the like are formed on the insulating substrate 31 made of glass or the like by a conventional method. For example, in the present embodiment, a glass substrate having 1.1 mm thickness (Commodity No. 7059 manufactured by Corning Inc.) may be used as the substrate 31. The pad 50 which is a metal layer having an area at least greater than the contact hole is formed at the location where the contact hole 43 is formed when the switching device 40 is formed. Further stacked thereon is the drawing-out electrode 37a.

Figure 4A:
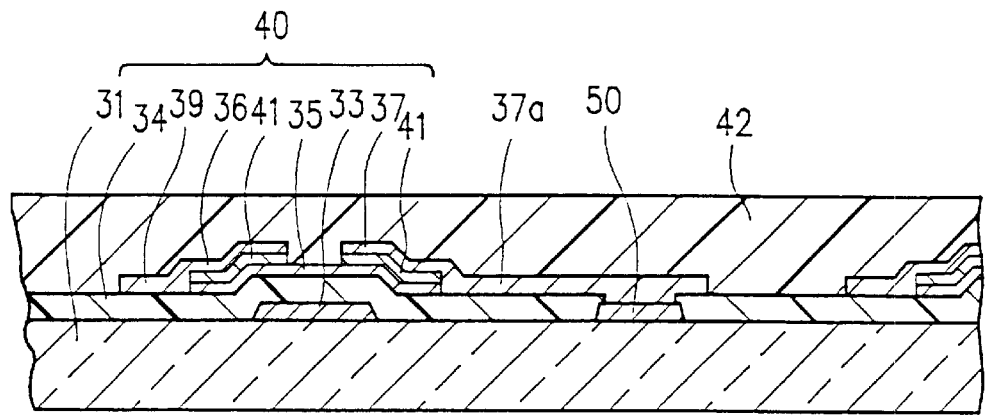
FIGS. 4A to 4C are schematic cross-sectional views illustrating another method for producing the liquid crystal display apparatus of the present invention.

The pad 50 becomes the lower metal layer at the contact hole and is formed of the same material as the gate bus line 32 of the TFT, or preferably of tantalum. This makes it possible to pattern and form the gate bus line 32, the gate electrode 33 and the pad 50 simultaneously. The drawing-out electrode 37a becomes the upper metal layer at the contact hole and is formed of the same material as the source electrode 36 and the drain electrode 37 of the TFT, or preferably of titanium. The source electrode 36, the drain electrode 37 and the drawing-out electrode 37a may be simultaneously patterned. As described above, at least two layers made of different metals are stacked at the location where the contact hole is formed as illustrated in FIG. 4A.

Figure 3A:
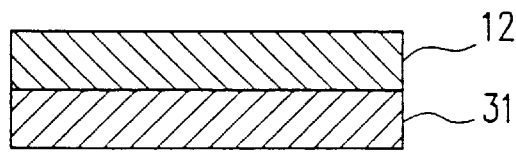
FIGS. 3A to 3F are schematic cross-sectional views illustrating an exemplary method for producing the liquid crystal display apparatus of the present invention.

Then, as illustrated in FIG. 3A, a photosensitive resin is applied onto the substrate 31 having devices formed thereon by spin-coating to form an organic insulating resin layer 12. In FIGS. 3A to 3F, each device is omitted from the illustration. For example, an acrylic type photosensitive resin is used as the organic insulating film 12. The organic insulating film 12 is formed by spin-coating, preferably at 500 rpm to 3000 rpm. In the present embodiment, the organic insulating layer 12 is applied at 1300 rpm for 30 seconds so that the thickness becomes about 2.5 µm.

Figure 3B:
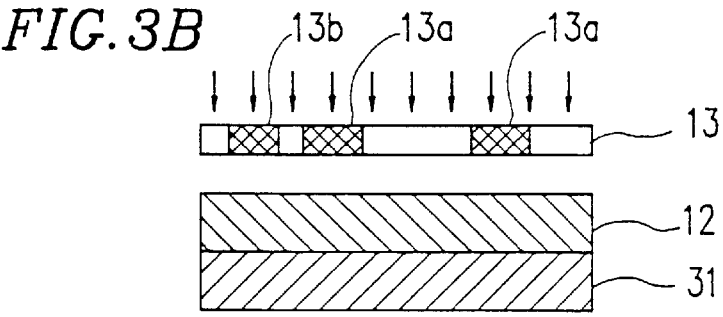
Figure 5:
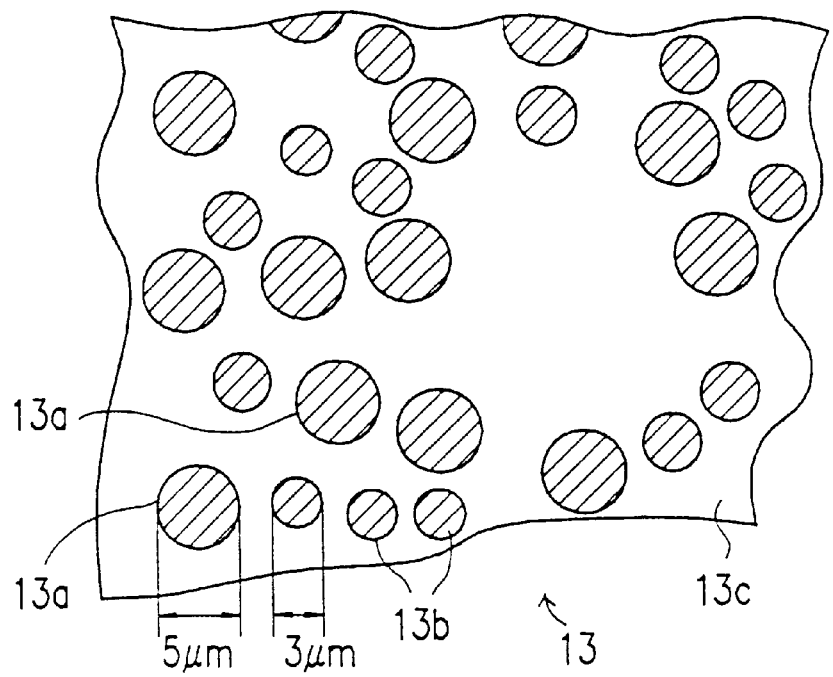
FIG. 5 is a schematic plan view illustrating an embodiment of a photo mask shown in FIG. 3B.

Next, the glass substrate 31 having the organic insulating layer 12 formed thereon is prebaked, for example, at 90° C. for 30 seconds. Then, as illustrated in FIG. 3B, a photo mask 13 is disposed above the organic insulating film 12, and then a light beam is radiated from above the photo mask 13 as indicated by arrows in FIG. 3B (exposure procedure). As the photo mask 13, a plate 13c having two kinds of circular pattern holes 13a and 13b of different sizes as illustrated in FIG. 5 can be used. The photo mask 13 of the present embodiment has pattern holes 13a of 5 µm diameter and pattern holes 13b of 3 µm diameter, which are randomly arranged, and any two neighboring pattern holes are separated at least by a distance of more than 2 µm. However, if the pattern holes are separated too far, then it becomes difficult to make the upper surface of the organic insulating film 15 formed on the organic insulating layer 12 to be continuously wave-like. It is therefore desirable to appropriately set the distance between the pattern holes. Furthermore, in order to make the metal layer (reflecting electrode 38) formed on the bottom of the contact hole to have a mirror surface, the circular pattern hole is not provided in the photo mask 13 at the location corresponding to the contact hole.

Figure 3C:
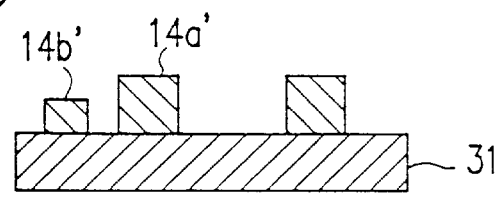

Next, the development of the organic insulating layer 12 is performed, using, for example, a developer of TMDH concentration of 2.38% manufactured by Tokyo Ohka Kogyo Co., Ltd. Consequently, as illustrated in FIG. 3C, a number of minute protrusions 14a' and 14b' having different heights which correspond to the pattern holes 13a and 13b are formed on the surface of the substrate 31. Immediately after the development, the upper corner of the protrusions 14a' and 14b' is sharp. In the present embodiment, the pattern hole 13a of 5 µm diameter makes the protrusion 14a of about 2.48 µm height, and the pattern hole 13b of 3 µm diameter makes the protrusion 14b of about 1.64 µm height.

Figure 3D:
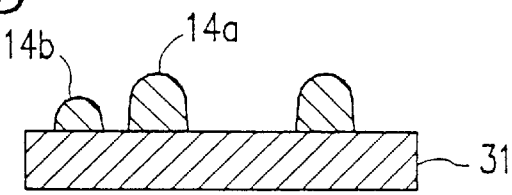

Next, the substrate 31 having the protrusions 14a' and 14b' formed thereon is subjected to heat treatment at about 200° C. for about 60 seconds. This softens and rounds the upper corners of the protrusions 14a' and 14b', thereby forming the protrusions 14a and 14b having a near circular cross-section at the tip end as illustrated in FIG. 3D.

Figure 3E:
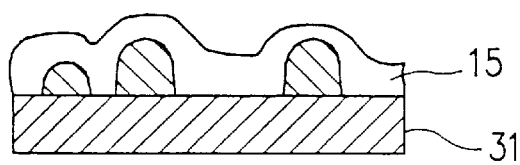

Next, as illustrated in FIG. 3E, the same photosensitive resin as the organic insulating layer 12 is applied onto the heat-treated substrate 31 by spin-coating to form an organic insulating film 15. The spin-coating is performed preferably at 1000 rpm to 3000 rpm. In the present embodiment, the spin-coating is performed at 2000 rpm for 30 seconds.

Figure 3F:
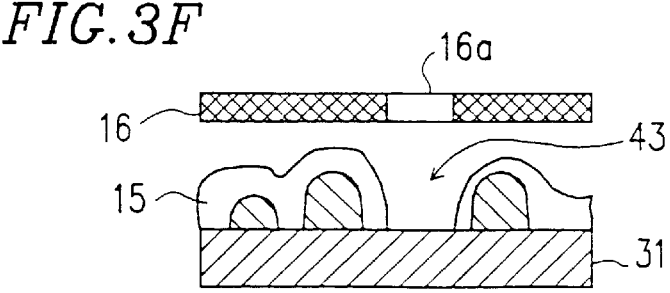

Next, the substrate 31 having the organic insulating film 15 is prebaked, for example, at 90° C. for 30 seconds. Then, as illustrated in FIG. 3F, a photo mask 16 is disposed above the organic insulating film 15, and the exposure is performed by radiating a light beam from above the photo mask 16. As the photo mask 16, a plate 16c illustrated in FIG. 6, having a pattern for the contact hole 16a, is used. As in the steps for forming the protrusions 14a' and 14b', the contact hole 43 is formed in the organic insulating film 15.

Next, the substrate 31 having the contact hole 43 is subjected to heat treatment at 200° C. for 60 seconds, and as in the steps where the protrusions 14a and 14b with rounded corner are formed by softening the protrusions 14a' and 14b', the corner of the contact hole 43 is rounded.

As described above, the organic insulating film 42 having the protrusions 14a and 14b formed out of the organic insulating layer 12 and the organic insulating film 15 formed over these protrusions is formed.

Next, the substrate 31 is immersed in an etchant which etches the uppermost layer of the at least two of the metal layers stacked at the contact hole. Preferably, the etchant is a mixture containing hydrogen fluoride of a concentration of 0.25% to 1.00%. For example, when the uppermost layer (drawing-out electrode 37a) is formed of titanium as in the present embodiment, the substrate 31 is immersed in a solution containing hydrogen-fluoride and nitric acid with a mixing ratio of 1:100 to 1:400, at 25° C. for 30 seconds. When the upper metal layer at the contact hole is etched, the development residue of the organic insulating film 15 at the contact hole is lifted off by the etchant permeating thereto.

Figure 31:
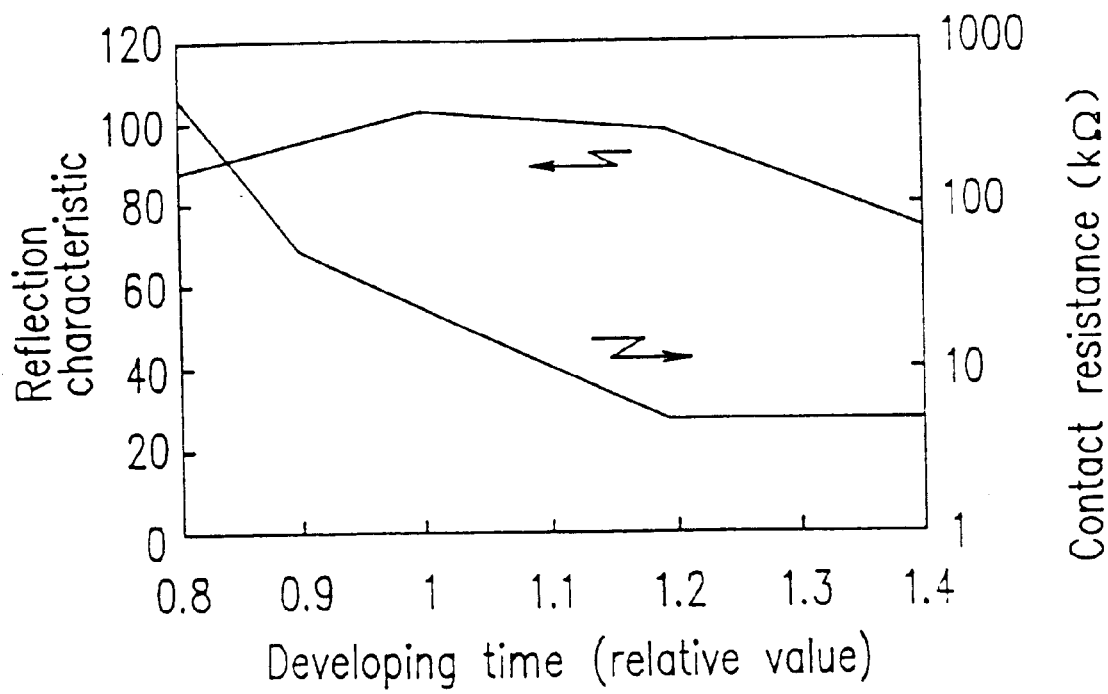
FIG. 31 is a graph illustrating relationships between the reflection characteristics of the reflecting plate and the developing time, and between the contact resistance of the contact hole and the developing time.

Here, for purposes of comparison, the developing time dependence of the reflection characteristic and the contact resistance of the reflecting plate when the above-described lift-off process is not performed is illustrated in FIG. 31 for the case where a contact hole having an open area of 900 µm² is formed. Here, the reflection characteristic of the reflecting plate refers to the brightness of light which was incident on the reflecting plate with an angle of 30° with respect to the normal line and was reflected and received along the normal line, the brightness of a MgO film being assigned a value of 100. The developing time is represented by a relative time with the developing time which realizes the optimal reflection characteristic being 1. Any developing time more or less than the optimal developing time cannot achieve the optimal reflection characteristic (the brightness greater than 100, for example). As can be seen from FIG. 31, when the lift-off treatment is not performed, even if the developing time is increased by a factor of 1.3, the contact resistance no longer decreases because of the development residue of the resin and excellent continuity cannot be obtained.

According to the present invention, by performing the lift-off treatment, a longer developing time to obtain excellent continuity of the contact hole is no longer necessary. As a result, the excessive development and the decrease in the film thickness can be prevented, which makes it possible to realize the excellent continuity and the excellent reflection characteristics of the contact hole throughout the entire substrate.

Then, the etching of the upper metal layer made of titanium proceeds, and the lower metal layer (pad 50) made of tantalum is reached. In this etching step, the portion of the upper metal layer where there is no development residue of the organic insulating film is rapidly etched. However, the etching can be substantially stopped at the lower metal surface by appropriately setting the etching selection ratio of the upper metal and the lower metal. For example, in the case of the stacked layers of titanium/tantalum, the etching selection ratio is more than 500:1. Therefore, the etching is stopped at the tantalum surface. This makes the bottom of the contact hole have a smooth surface.

If an excellent continuity of the contact hole is obtained at this stage, then there is no need to remove all the upper metal layer (titanium). By partially etching the upper metal in the direction of thickness (for example, the surface portion only), the development residue at the location of the contact hole may be sufficiently removed without exposing the lower metal layer.

In addition to those mentioned above, tantalum added with molybdenum, tungsten, niobium, etc. as an impurity can be used as a material for the gate bus lines 32 (gate electrode 33 and the drawing-out electrode 37a). A multilayer structure where aluminum is coated with tantalum can also be used for the gate bus line. When an impurity is added to tantalum, the change in the etching selection ratio from titanium is small. When the gate line of the multi-layer structure is used, if the surface of the pad 50 is made of tantalum, then the selective etching with titanium can be nicely performed.

In order to effectively remove the development residue, it is preferable that the opening of one contact hole have an area greater than 400 $\mu m^2$. Table 1 illustrates the deviation of the contact resistance within a 300×300 mm substrate when the opening area of the contact hole is changed.

TABLE 1

| | Deviation of the contact resistance | | | | | | |
|---|---|---|---|---|---|---|---|
| Area ($\mu m^2$) | 25 | 100 | 225 | 324 | 400 | 529 | 625 |
| Resistance ($\Omega$) | Measurement not possible | 80~ 1.2M | 18~50M | 8~7K | 6~10 | 5~7 | 3~5 |

As can be seen from Table 1, when the area of the contact hole is greater than 400 $\mu m^2$, the deviation of the contact resistance is small and a low resistance value is obtained. However, since the reflecting electrode formed at the location of the contact hole has a mirror surface, the increase in the opening area of the contact hole means that the display becomes dark and the display quality of the reflection type liquid crystal display apparatus becomes deteriorated.

Figure 32:
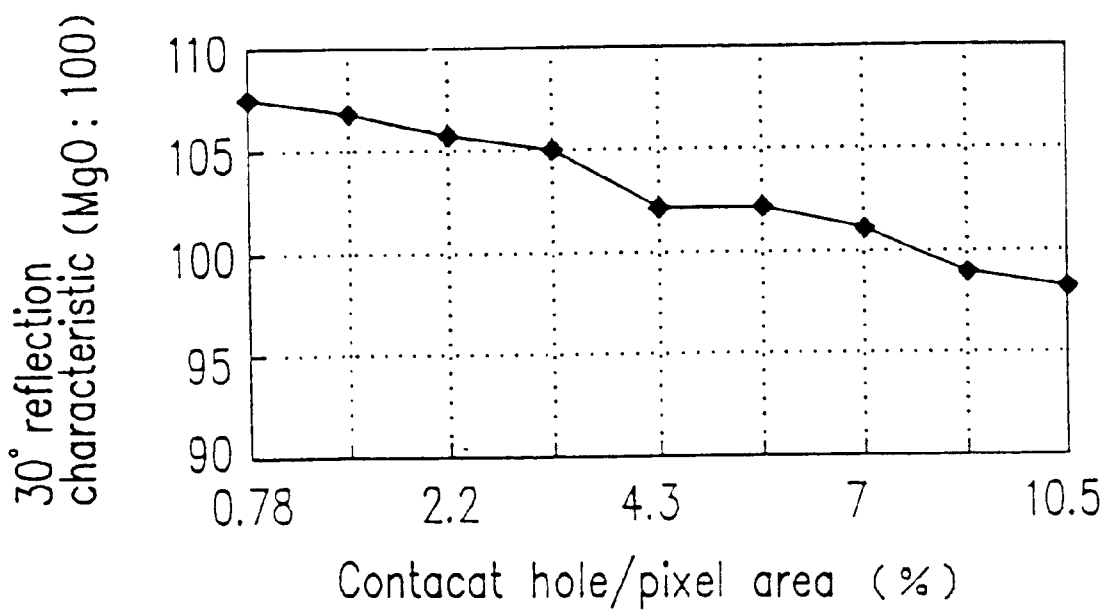
FIG. 32 is a graph illustrating a relationship between a ratio of the area of the contact hole to the area of the reflecting plate (pixel electrode) and the reflection characteristics of the reflecting plate.

FIG. 32 illustrates the change in the brightness of the reflecting plate when the ratio of the opening area of the contact hole to the area of the reflecting electrode is changed. The brightness of the reflecting plate is measured by the 30° incident-vertical reception and is illustrated with the brightness of the MgO film being 100 (as in the case illustrated with reference to FIG. 31). As can be seen from FIG. 32, when the opening area of the contact hole exceeds 8% of the area of the reflecting electrode, the brightness gets below 100. Therefore, the opening area of the contact hole is preferably 8% or less of the area of the reflecting electrode, and more preferably, 4% or less. For example, if the area of the reflecting electrode is about 240×120 $\mu m^2$, then the opening area of the contact hole is preferably 1440 $\mu m^2$ or less.

When the opening area of one contact hole is 400 $\mu m^2$ or more, and the opening area of one contact hole is 8% or less of the reflecting electrode, then the area of the reflecting electrode can be calculated to be at least 5000 $\mu m^2$.

Figure 4B:
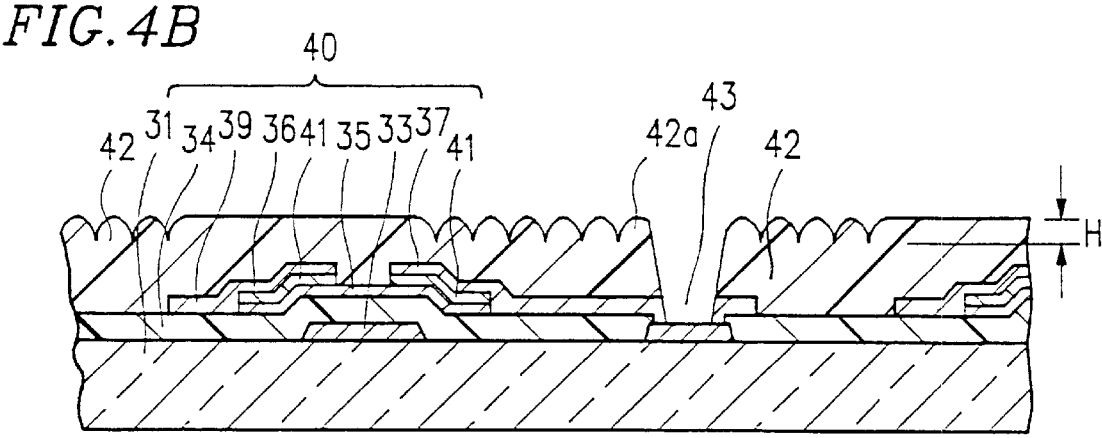
Figure 4C:
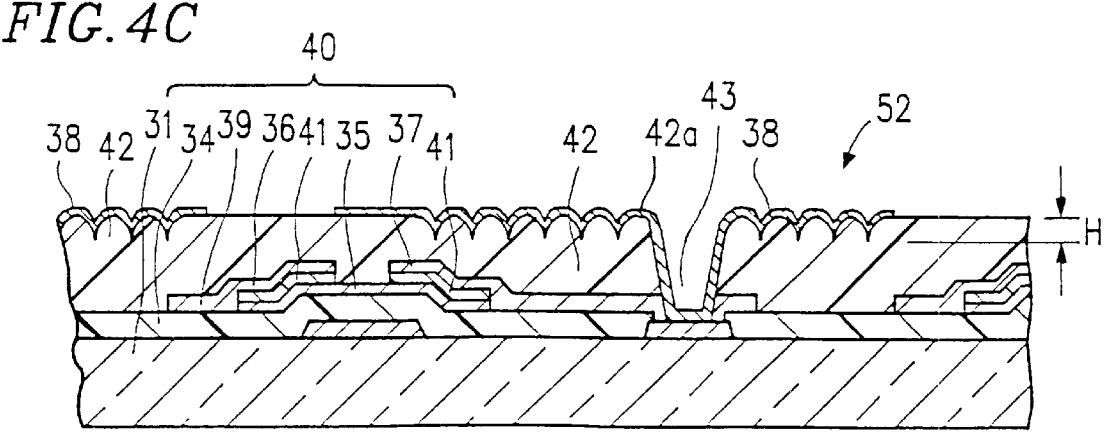

As described above, after forming the contact hole 43 in the organic insulating film 42 and performing the etching process as in FIG. 4B, a reflecting electrode 38 made of aluminum is formed in the predetermined area on the organic insulating film 42 as illustrated in FIG. 4C. The reflecting electrode 38 is, for example, formed by sputtering in the present embodiment. Any electrically conductive material which reflects light or has a scattering property can be used for the reflecting electrode 38. Besides aluminum, for example, silver or the like can be used.

Next, an alignment film 44 is formed on the substrate 31 (FIG. 1). The alignment film 44 is formed by applying an alignment film material by printing or spin-coating so as to cover at least the region of the substrate 31 where the reflecting electrode 38 is formed, and by baking and curing the applied material at 160° C. to 180° C. When a vertical alignment film is to be formed, a conventional material for the vertical alignment film is used, and when a horizontal alignment film is to be formed, rubbing treatment or the like is performed after baking and curing the alignment film. Then, the lower substrate (active matrix substrate) 30a is completed.

As illustrated in FIG. 1, the upper substrate (opposing substrate) 30b includes color filters 46 formed on the substrate 45. The color filter 46 includes a magenta or green filter 46a formed at the location opposing the reflecting electrode 38 of the substrate 30a and a black filter 46b formed at the location not opposing the reflecting electrode 38. A transparent electrode 47 made of ITO or the like is formed on the entire surface of the color filter 46, and an alignment film 48 is further formed thereon. The substrates 30a and 30b are oppositely put together so that the reflecting electrode 38 and the filter 46a are matched, and liquid crystal 49 is injected therebetween to complete the reflection type liquid crystal display apparatus 30.

Figure 7:
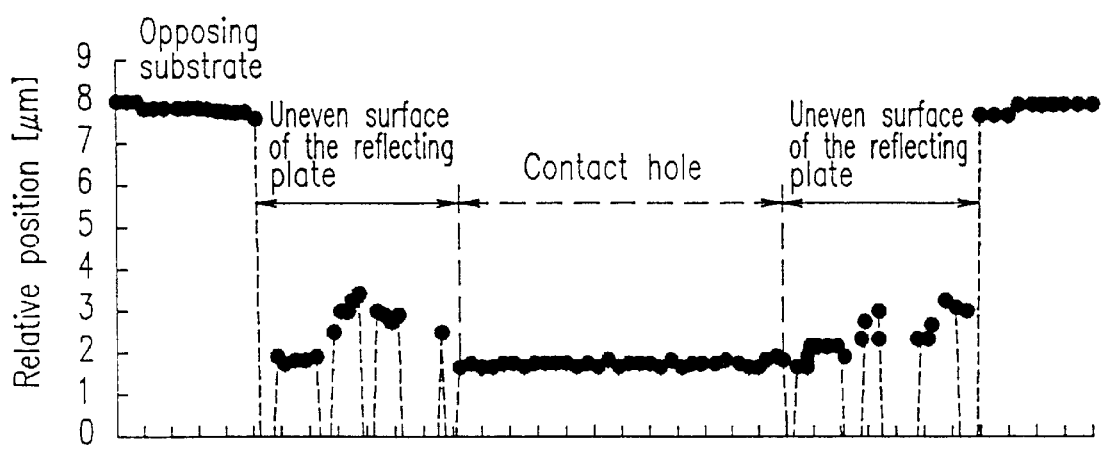
FIG. 7 is a diagram illustrating the result of a measurement on a thickness of the liquid crystal layer of the liquid crystal display apparatus of the present invention.

In the liquid crystal display apparatus 30 produced as described above, the bottom of the contact hole 43 provided for every pixel is in a mirror-like condition. Therefore, by making use of the bottom portion which is in a mirror-like condition, the measuring method using laser light previously described can determine the thickness of the liquid crystal layer of the liquid crystal display apparatus 30. The result of such measurement using laser light is illustrated in FIG. 7. As can be seen from FIG. 7, the measurement can be stably performed at the location of the contact hole, and the thickness of the liquid crystal layer can be obtained from the relative position of the contact hole with respect to the opposing substrate.

(Embodiment 2)

In the present embodiment, a liquid crystal display apparatus in which the switching devices are MIM devices and the insulating resin film is formed of a non-photosensitive resin will be described.

Figure 8:
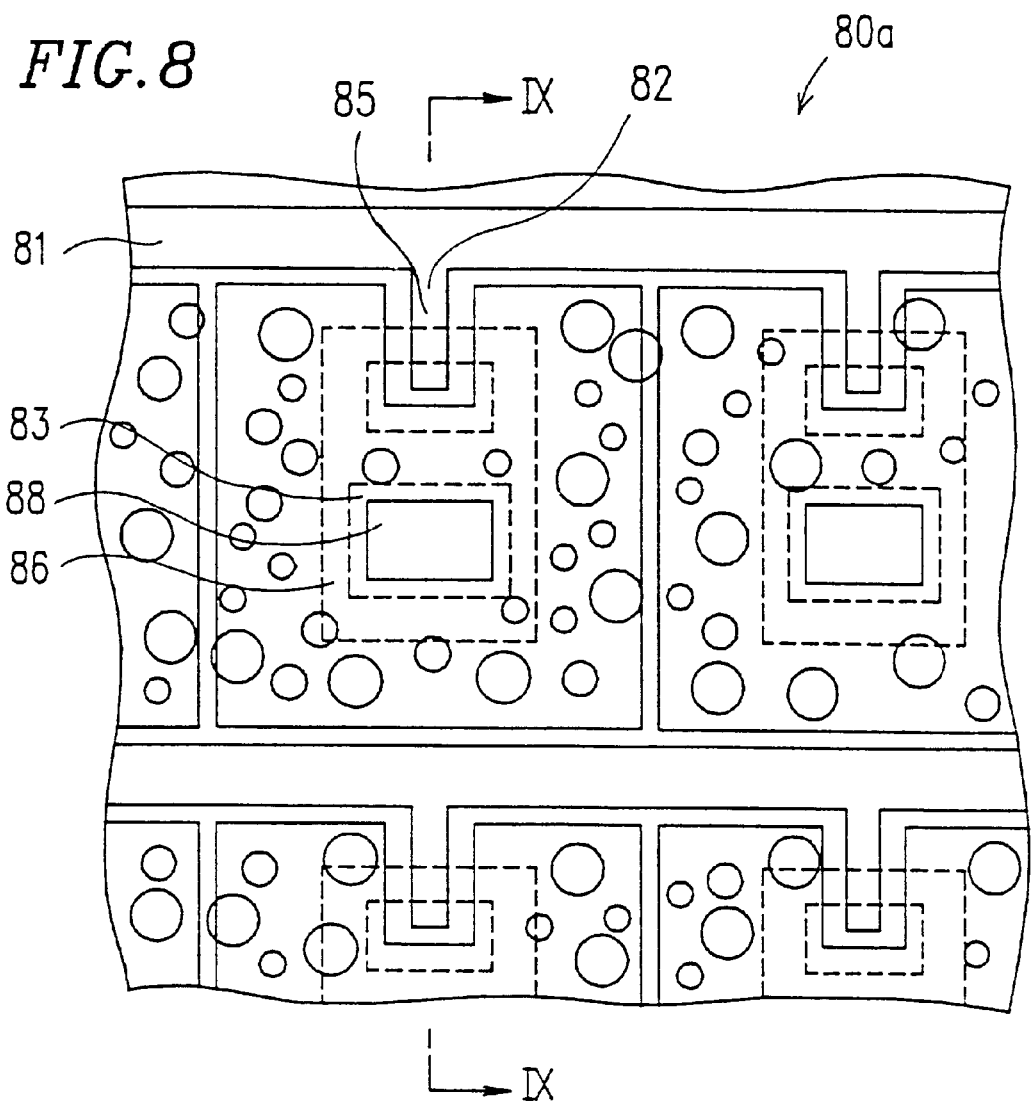
FIG. 8 is a schematic plan view of an active matrix substrate in another embodiment of a liquid crystal display apparatus of the present invention.
Figure 9:
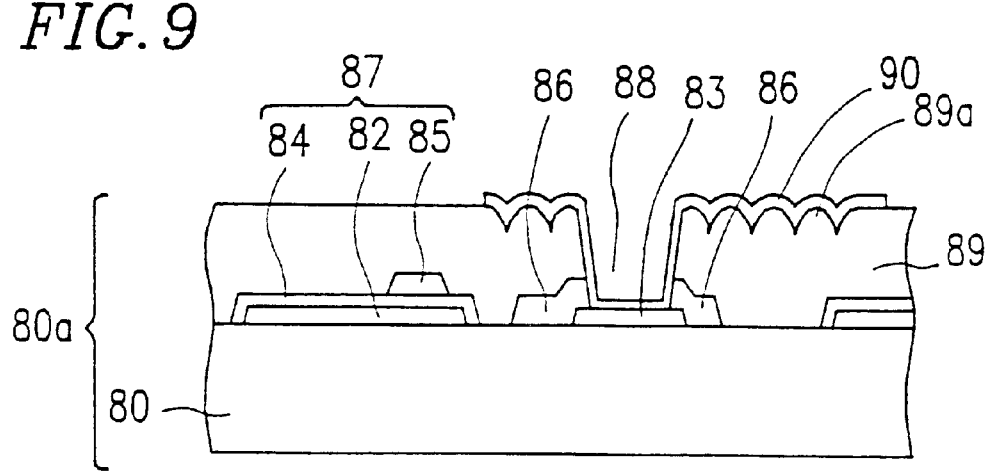
FIG. 9 is a cross-sectional view of the substrate shown in FIG. 8 taken along the line IX—IX.

FIG. 8 is a schematic plan view of the lower substrate (active matrix substrate) 80a having MIM (metal-insulator-metal) switching devices 87 formed thereon, and FIG. 9 is a cross-sectional view of the substrate 80a illustrated in FIG. 8 taken along the line IX—IX.

First, the lower substrate 80a will be described. As illustrated in FIGS. 8 and 9, a plurality of first lines 81 made of tantalum or the like are provided in parallel to each other on the insulating substrate 80 made of glass or the like, and a first electrode 82 is branched from the first line 81. The first line 81 functions as a scanning line. Furthermore, as in Embodiment 1, a pad 83 having the area at least greater than the contact hole 88 is formed on the substrate 80 at the location where the contact hole 88 is to be formed. The pad 83 is formed of the same material as the first line 81 and becomes the lower metal layer of the drawing-out electrode 86.

As illustrated in FIG. 9, an insulating film 84 is formed so as to cover the first line 81 and the first electrode 82. In the present embodiment, the insulating film 84 is formed by performing anodic oxidation on the tantalum of which the first line and the first electrode are made at the voltage of 25 V to 40 V. A second electrode 85 made of titanium, molybdenum, aluminum, etc. is formed on the first electrode 82 coated with the insulating film 84. The MIM device 87 is formed of the first electrode 82, the insulating film 84 and the second electrode 85.

The drawing-out electrode 86 is formed on the substrate 80 at the location where the contact hole is to be formed so as to coat the pad 83. The drawing-out electrode 86 is connected to the second electrode 85. In the present embodiment, as illustrated in FIG. 8, the drawing-out electrode 86 is formed at the same time when the second electrode 85 is patterned so that the drawing-out electrode 86 is integrally formed with the second electrode 85.

An organic insulating film 89 made of a polyimide type non-photosensitive resin is formed on the entire surface of the substrate 80 so as to cover the first line 81 and first electrode 82 which are coated with the insulating film 84, the second electrode 85 and the drawing-out electrode 86. A contact hole 88 is formed in the organic insulating film 89 at the location of the drawing-out electrode 86. Moreover, protrusions 89a are formed in the region of the organic insulating film 89 where the reflecting electrode (pixel electrode) 90 is to be formed.

The reflecting electrode 90 made of aluminum or the like is formed on the organic insulating film 89 so as to cover the region where the protrusions 89a are formed and the contact hole 88. The reflecting electrode 90 is connected to the drawing-out electrode 86 by the pad 83 at the contact hole 88.

Next, a method for producing the reflection type liquid crystal display apparatus of the present embodiment will be described with an emphasis on a method for forming the active matrix substrate 80a.

First, devices such as the MIM devices 87, the pad 83, the drawing-out electrode 86, etc. are formed on the insulating substrate 80 made of glass or the like by using a conventional method. In the present embodiment, a glass substrate of 1.1 mm thickness (Commodity No. 7059 manufactured by Corning Inc.) is, for example, used as the substrate 80.

When forming the MIM device 87, the pad 83 which is a metal layer having the area greater than the contact hole is formed at the location where the contact hole 88 is to be formed. Furthermore, the drawing-out electrode 86 is stacked thereon.

The pad 83 becomes the lower metal layer at the contact hole and is made of the same material as the first electrode 82 of the MIM device 87, or preferably of tantalum. This makes it possible to pattern and form the first line 81, the first electrode 82 and the pad 83 simultaneously.

The drawing-out electrode 86 becomes the upper metal layer at the contact hole. The drawing-out electrode 86 is formed of the same material as the second electrode 85 of the MIM device 87, or preferably of titanium. The second electrode 85 and the drawing-out electrode 86 may be patterned simultaneously. As described above, at least two layers made of different metals are stacked at the location where the contact hole is to be formed as illustrated in FIG. 10A.

As illustrated in FIG. 10A, an organic insulating layer 101 is formed by applying a non-photosensitive resin onto the substrate 80 having each device formed thereon by spin-coating and then performing post-baking (in the present embodiment, at 230° C. for 90 seconds). A polyimide type non-photosensitive resin is used for the organic insulating layer 101. The organic insulating layer is formed by spin-coating performed preferably at 500 rpm to 3000 rpm. In the present embodiment, the spin-coating is performed at 1300 rpm for 30 seconds and the material is applied so that the thickness of the organic insulating layer 101 becomes about 2.5 μm.

Next, the same photoresist 102 as the one used when the MIM devices 87 are formed is applied by spin-coating onto the glass substrate 80 having the organic insulating layer 101 formed thereon, and the substrate is pre-baked, for example, at 90° C. for 60 seconds. In the present embodiment, OFPR800 manufactured by Tokyo Ohka Kogyo Co., Ltd. is used as the photoresist and the thickness is taken to be 3.2 μm.

Next, as in the case where the photosensitive resin layer was exposed in Embodiment 1, the photoresist 102 is exposed by using a photo mask. For example, as illustrated in FIG. 5, the photo mask 13 made of the plate 13c having two kinds of circular pattern holes 13a and 13b of different sizes can be used. Furthermore, in order to make the metal layer (reflecting electrode 90) formed at the bottom of the contact hole to be in a mirror-like condition, the circular pattern hole is not provided in the photo mask 13 at the location corresponding to the contact hole.

Next, the photoresist 102 is developed by using, for example, a developer having TMDH concentration of 2.38% manufactured by Tokyo Ohka Kogyo Co., Inc. Consequently, as illustrated in FIG. 10B, a number of minute protrusions 104a' and 104b' of the photo resist corresponding to the pattern holes 13a and 13b are formed on the organic insulating layer 101.

Next, dry-etching is performed on the organic insulating layer 101 by using the protrusions 104a' and 104b' of the photoresist as a mask, and the protrusions 104a' and 104b' are transferred onto the organic insulating layer 101. Then, using an alkaline solution, the protrusions 104a' and 104b' of the photoresist are removed. Consequently, as illustrated in FIG. 10C, the protrusions 105a' and 105b' patterned out of the organic insulating layer 101 are formed on the substrate 80. In the present embodiment, the dry-etching uses $O_2$ gas and the selection ratio of the photoresist 102 and the non-photosensitive resin 101 is 1:1. When the etching is finished, the upper tip end of the protrusions 105a' and 105b' has a sharp corner.

Next, as illustrated in FIG. 10D, the same non-photosensitive resin as the organic insulating layer 101 is applied onto the substrate 80 by spin-coating to form an organic insulating film 103. Preferably, the spin-coating is performed at 1000 rpm to 3000 rpm. In the present embodiment, the spin-coating is performed at 2000 rpm for 30 seconds, and then the substrate is post-baked at 230° C. for 90 seconds.

Next, a photoresist 106 is applied onto the glass substrate 80 having the organic insulating film 103 formed thereon by spin-coating, and then the substrate is pre-baked at 90° C. for 60 seconds.

Figure 6:
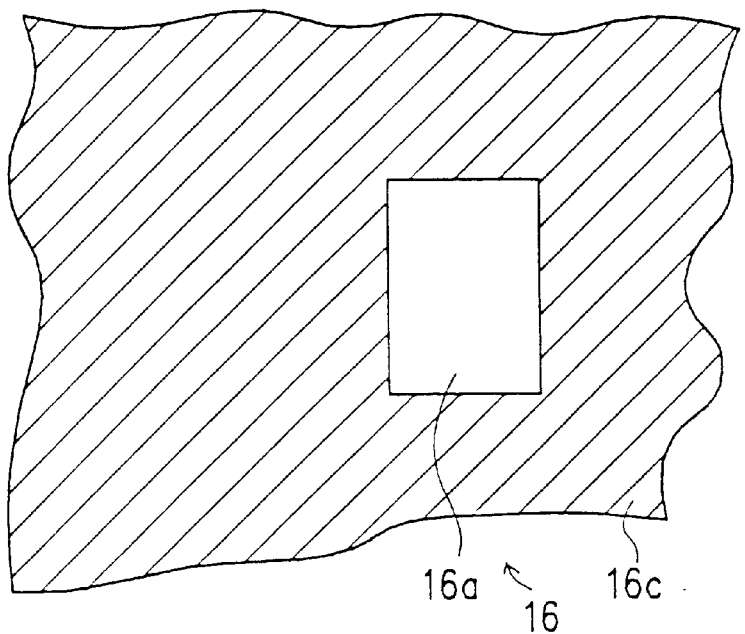
FIG. 6 is a schematic plan view illustrating an embodiment of a photo mask shown in FIG. 3F.

Next, using, for example, a photo mask patterned for contact holes like the photo mask 16 illustrated in FIG. 6, the photoresist 106 is exposed and developed. Consequently, the contact hole pattern of the photoresist as illustrated in FIG. 10E is formed on the organic insulating film 103. Next, using this photoresist pattern as a mask, dry-etching similar to the one which formed the above-mentioned protrusions 105a' and 105b' is performed, and the contact hole 88 is formed in the organic insulating film 103. As a result of the above-described processes, an organic insulating film 89 having the protrusions 105a' and 105b' formed out of the organic insulating layer 101 and the organic insulating film 103 formed on these protrusions is formed as illustrated in FIG. 10F.

In the dry-etching process, dry-etching proceeds faster in the central region of the substrate than on the periphery of the substrate because of the difference in the plasma density within the etching apparatus. In particular, a difference in the etching rate between the four corners of the substrate and the central region is large. Table 2 illustrates the deviation of the reflection characteristics of the reflecting plate in the 320 mm×400 mm substrate produced according to the present embodiment.

TABLE 2

Deviation of the reflection characteristics

| Etching time (Relative value) | 0.5 | 0.9 | 1 | 1.1 | 1.2 | 1.3 |
|---|---|---|---|---|---|---|
| Reflection characteristics within the substrate (320 mm × 420 mm) | 55 ∫ 80 | 90 ∫ 100 | 95 ∫ 103 | 80 ∫ 105 | 70 ∫ 100 | 50 ∫ 90 |

In Table 2, the etching time is indicated in the relative value, taking the etching time resulting in the optimum reflection characteristics to be one. As can be seen from Table 2, by appropriately selecting the etching time, the deviation of the reflection characteristics can be kept within 10%.

The following procedure is similar to that in Embodiment 1.

The substrate 80 is immersed in an etchant which etches the uppermost layer (the drawing-out electrode 86 in the present embodiment) of at least two metal layers stacked at the contact hole. The etching is substantially stopped at the lower layer metal surface because of the etching selection ratio of the upper metal and the lower metal (the pad 83 in the present embodiment), and the bottom of the contact hole 88 is formed to have a smooth surface.

Here, even if the etching is performed somewhat insufficiently on the periphery of the substrate because of the difference in plasma density during the dry-etching step for forming the contact hole 88, etching residue (organic insulating film 103) is lifted off by the permeation of the etchant during the following wet-etching step of the upper metal layer. Therefore, since there is no need to increase the dry-etching time in order to obtain excellent continuity of the contact hole on the periphery of the substrate, the formation of too large contact hole and the decrease in the film thickness of the resin layer due to that the resist is excessively etched in the central region of the substrate can be prevented. This makes it possible to realize excellent continuity of the contact hole and excellent reflection characteristics through the entire substrate.

For example, for a reflecting plate having the contact hole of 400 $\mu m^2$ formed in the dry-etching step with the etching time (relative value) of one in the above Table 2, when the lift-off treatment is not performed, the contact resistance is 5 to 35 Ω. By performing the lift-off treatment according to the present embodiment, the contact resistance can be made 3 to 5 Ω throughout the substrate. Therefore, the deviation of the reflection characteristics in the substrate can be kept within 10%, and contact holes having excellent continuity condition can be formed throughout the substrate.

As the lower metal layer at the contact hole, as described in Embodiment 1, tantalum added with an impurity may be used instead of tantalum. For example, Inoue et al describe in Japanese Laid-Open Patent Publication No. 7-20500 that tantalum added with one impurity selected from the group consisting of elements having valance of four or less (such as silicon, aluminum, etc.) and with one impurity selected from the group consisting of elements having valance of six or greater (such as tungsten, chromium, iron, manganese, rhenium, etc.) is used for the first electrode of the MIM device. Furthermore, Inami et al suggest in Japanese Laid-Open Patent Publication No. 7-92502 that zirconium is added to the tantalum used for the first electrode of the MIM device. Such material having tantalum as the main ingredient also has a sufficiently large selection ratio to titanium and can be used as the material for the first electrode in the liquid crystal display apparatus of the present invention. For example, tantalum containing 50 atomic % or less of nitrogen, tantalum containing 10 atomic % or less of silicon and tungsten, or tantalum containing 10 atomic % or less of one or more elements having valance of four or less and 10 atomic % or less of one or more elements having valance of six or greater can be used.

Next, a reflecting electrode 90 made of aluminum is formed in the predetermined region of the organic insulating film 89 where the contact hole 88 is formed. The reflecting electrode 90 is formed, for example, by sputtering in the present embodiment. Any electrically conductive material which reflects light or has a scattering property can be used for the reflecting electrode 90. For example, silver or the like can be used instead of aluminum. The reflecting electrode 90 is connected to the drawing-out electrode 86 within the contact hole 88 by the pad 83.

At this stage, if excellent continuity of the contact hole is obtained, then there is no need to remove all the upper metal layer. Even if the lower metal layer is not exposed, the development residue at the location of the contact hole may be sufficiently removed by partially etching the upper metal layer in the direction of the thickness (for example, only the surface portion).

As described above, the active matrix substrate 80a illustrated in FIG. 9 is completed. Also in the liquid crystal display apparatus according to Embodiment 2, by appropriately selecting the opening area of the contact hole 88 like the liquid crystal display apparatus 30 according to Embodiment 1, bright display is realized. Furthermore, the bottom of the contact hole 88 formed for every pixel is in a mirror-like condition. Therefore, by making use of this bottom portion in the mirror-like condition, the thickness of the liquid crystal layer can be measured by the previously described measuring method using laser light.

(Embodiment 3)

Figure 11:
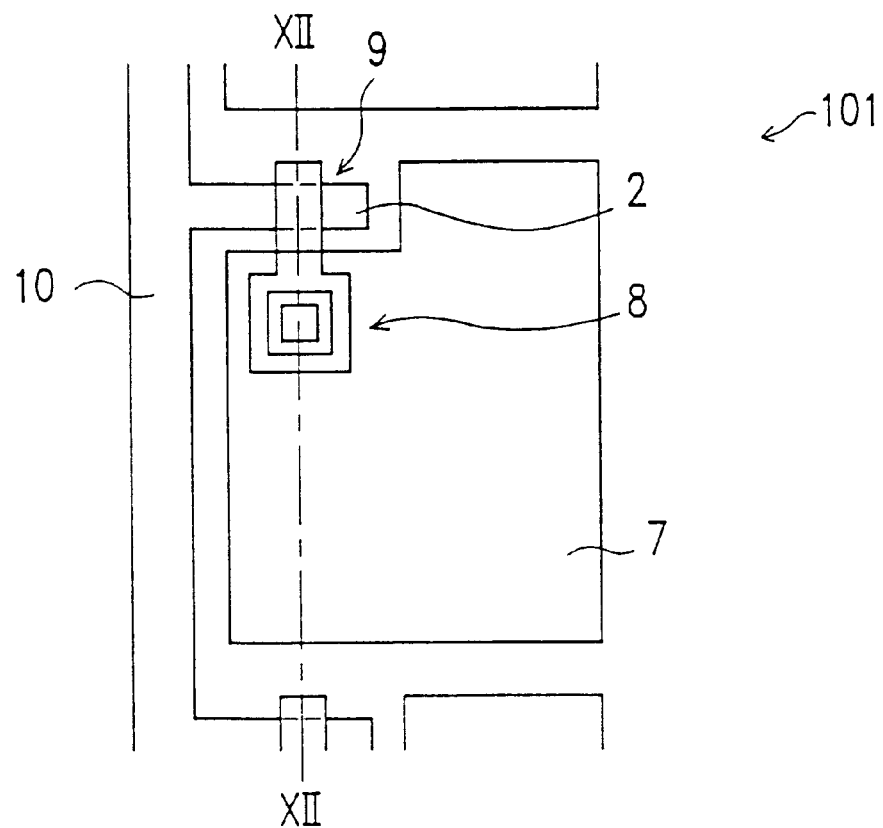
FIG. 11 is a schematic plan view of an embodiment of an active matrix substrate of the present invention.
Figure 12:
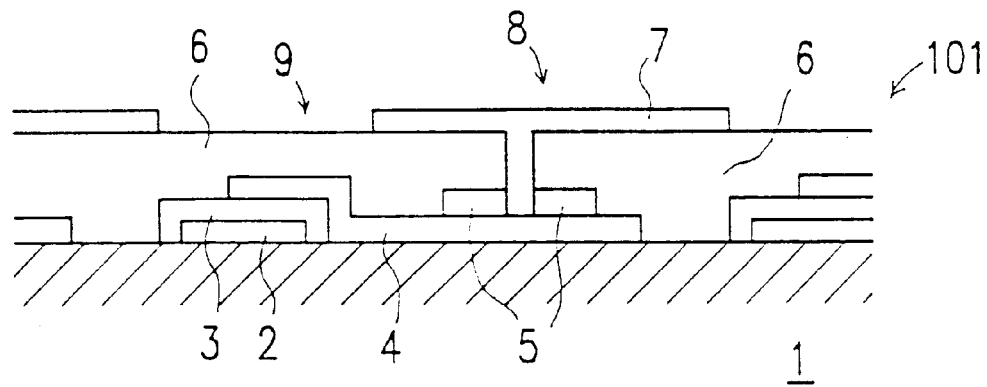
FIG. 12 is a cross-sectional view of the substrate shown in FIG. 11 taken along the line XII—XII.

An active matrix substrate which may be applied to a transmission type liquid crystal display apparatus will be described in the present embodiment. FIG. 11 is a schematic plan view illustrating one pixel portion of an active matrix substrate of the present invention according to one preferred embodiment. FIG. 12 is a cross-sectional view of the substrate illustrated in FIG. 11 taken along the line XII—XII. In the present embodiment, an active matrix substrate where driving devices (switching devices) which are diode type two-terminal devices (MIM devices) are provided will be described.

As illustrated in FIGS. 11 and 12, the pixel portion of the active matrix substrate 101 has a glass substrate 1, a driving signal line 10 formed on the glass substrate 1, a pixel electrode 7 and a driving device 9 (switching device). As illustrated in FIG. 11, the driving signal line 10 has a branch which serves as the lower layer electrode 2 of the driving device 9. As illustrated in FIGS. 11 and 12, the lower layer electrode 2 is formed on the glass substrate 1 at the location of the driving device 9, and an insulating film 3 is further formed thereon. An upper layer electrode 4 is patterned and formed on the insulating film 3. Consequently, a diode type two-terminal device 9 including the lower layer electrode 2, the insulating film 3 and the upper layer electrode 4 is formed. The upper layer electrode 4 extends toward the pixel electrode 7, and a metal layer 5 is formed on this extending portion.

An insulating protective film 6 is formed on the entire surface of the glass substrate 1 so as to cover the driving device 9. A pixel electrode 7 is patterned and formed on the insulating protective film 6. The pixel electrode 7 is electrically connected to the upper layer electrode 4 of the driving device 9 through a contact hole 8 provided in the insulating protective film 6 and the metal layer 5. As described above, at least two layers, namely the extended upper layer electrode 4 and the metal layer 5, are provided in the vicinity of the bottom of the contact hole 8. In the present embodiment, the upper layer electrode 4 is preferably formed of titanium, and the metal layer 5 is preferably formed of ITO film. When three or more conductive layers are to be provided in the vicinity of the bottom of the contact hole 8, the upper layer electrode is preferably formed as the lowermost layer.

Figure 13:
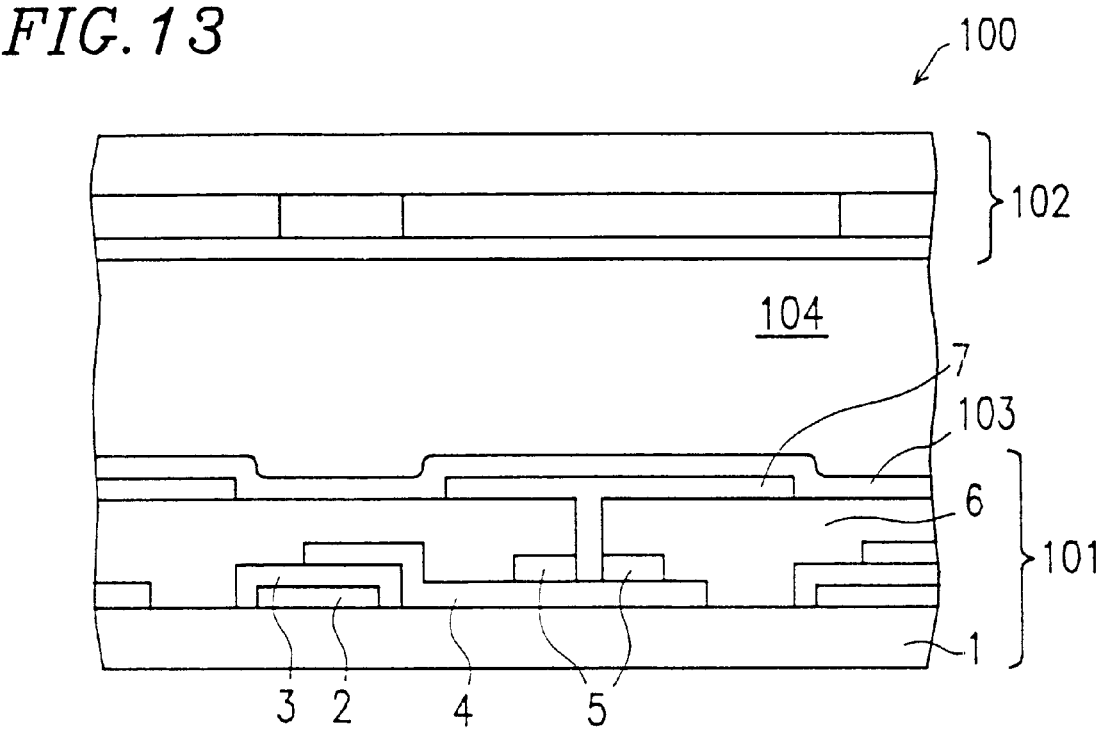
FIG. 13 is a schematic cross-sectional view illustrating a liquid crystal display apparatus utilizing the substrate shown in FIG. 11.
Figure 29:
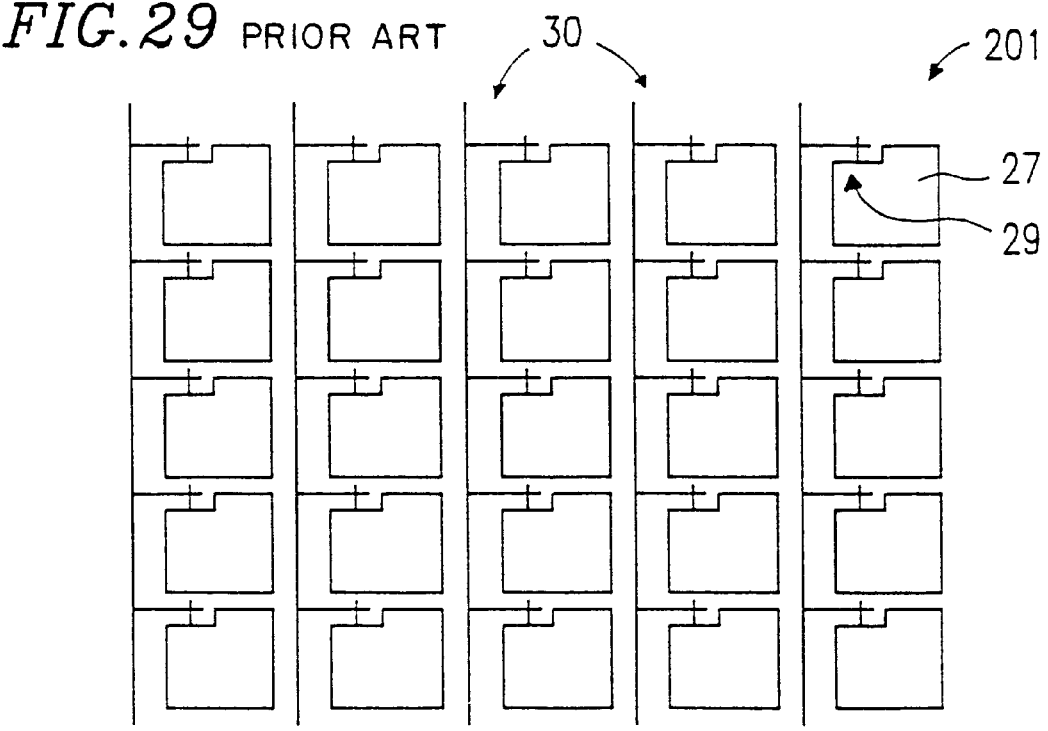
FIG. 29 is a plan view illustrating an overall structure of the conventional active matrix substrate.
Figure 30A:
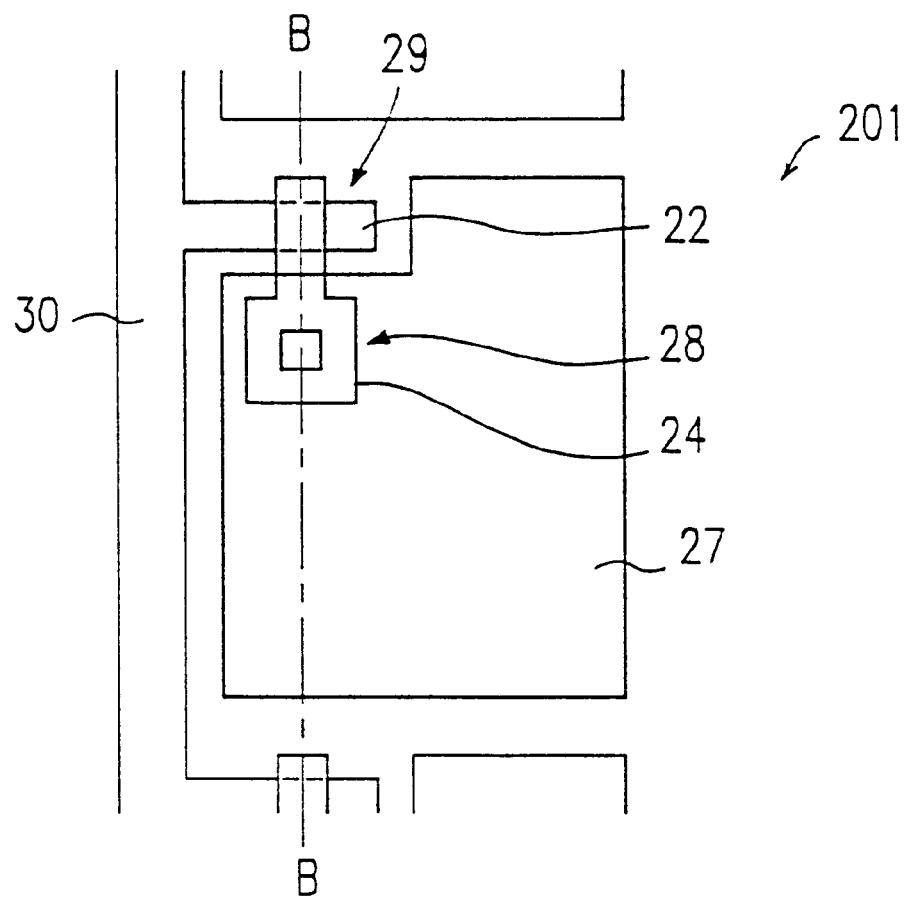
FIG. 30A is a schematic plan view for an active matrix substrate of the conventional liquid crystal display apparatus.
Figure 30B:
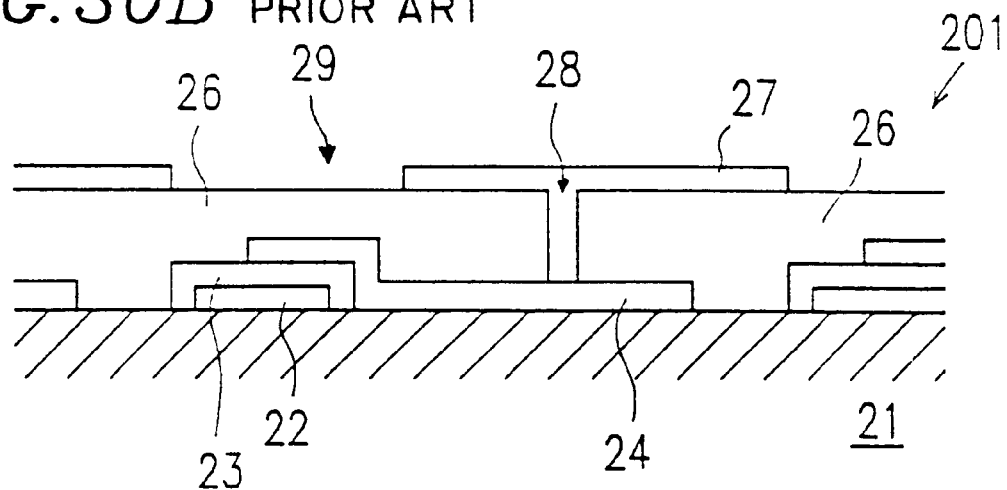
FIG. 30B is a cross-sectional view of the substrate shown in FIG. 30A taken along the line B—B.

The overall structure of the active matrix substrate 101 is similar to that of the conventional active matrix substrate 201 illustrated in FIG. 29, where the pixel electrodes 7 are arranged in a matrix configuration and each pixel electrode 7 is connected to the driving signal line 10 via a corresponding driving device 9. The liquid crystal display apparatus 100 is produced by holding a liquid crystal layer 104 between the active matrix substrate 101 of the present embodiment and the opposing substrate 102 (FIG. 13).

Next, an exemplary method for producing the active matrix substrate and the liquid crystal display apparatus of the present embodiment will be described. FIGS. 14A to 14F are schematic cross-sectional view illustrating the production steps for the active matrix substrate 101.

Figure 14A:
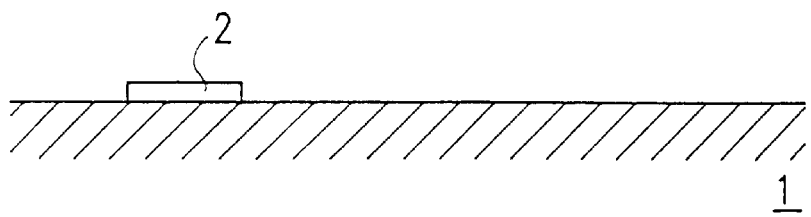
FIGS. 14A to 14F are schematic cross-sectional views illustrating a method for producing an active matrix substrate of the present invention.

First, tantalum (Ta) is deposited on the glass substrate 1 to a thickness of 300 nm by sputtering. Then, this Ta film is patterned by using a photo mask to form the driving signal line 10 and its branch, that is, the lower layer electrode 2 (FIG. 14A).

Figure 14B:

Next, an insulating film of 80 nm thickness made of $SiN_x$ is deposited on the entire surface of the glass substrate 1 by plasma CVD so as to cover the lower layer electrode 2. Then, this $SiN_x$ insulating film is patterned by using a photo mask to form the insulating layer 3 (FIG. 14B).

Figure 14C:
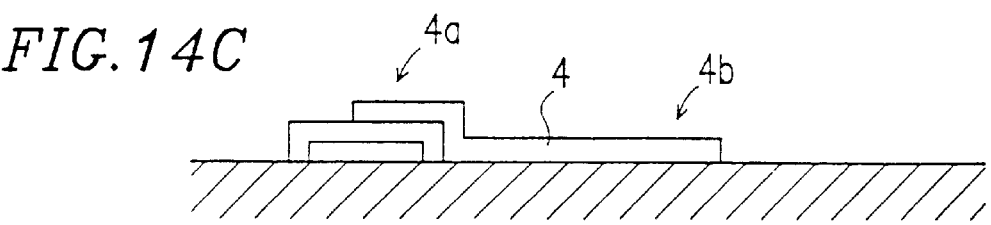

Next, titanium (Ti) is deposited on the entire surface of the substrate 1 to a thickness of 300 nm by sputtering. Then, this Ti film is patterned by using a photo mask to form the upper layer electrode 4 (FIG. 14C). The upper layer electrode 4 is formed so as to include a portion 4a, which is stacked on the lower electrode 2 and the insulating layer 3, and an extending portion 4b.

Figure 14D:
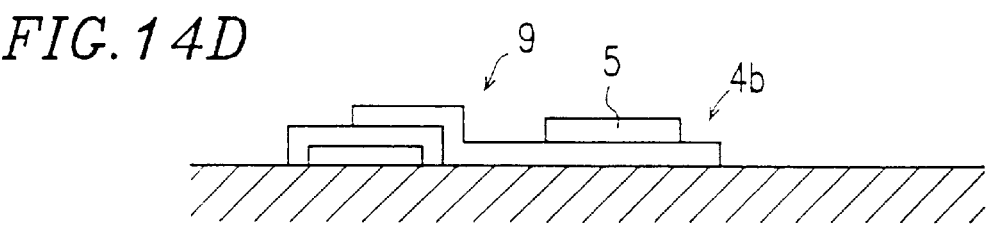

Next, a transparent conductive film made of indium tin oxide (ITO) of 100 nm thickness is deposited on the entire surface of the substrate 1 by sputtering. This ITO film is patterned by using a photo mask to form a conductor layer (metal layer) 5 on the extending portion 4b of the upper layer electrode 4 (FIG. 14D). The contact hole 8 is to be formed at the location of this metal layer 5.

Figure 14E:
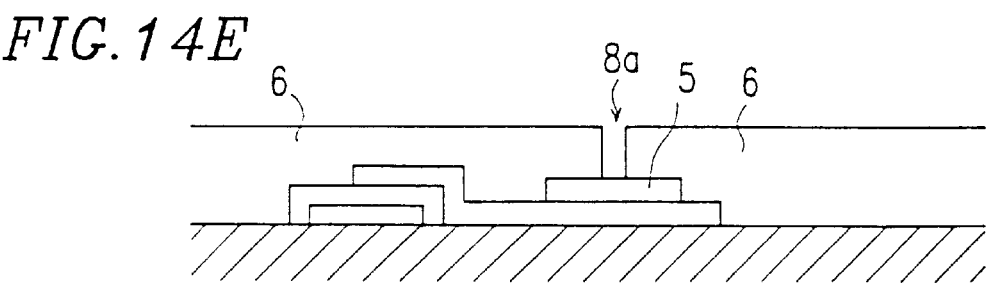

As described above, the driving device 9 having an MIM (Metal-Insulator-Metal) structure including the lower layer electrode 2, the insulating film 3 and the upper layer electrode 4 is formed. Next, a photosensitive resinous material is applied to a thickness of 1 μm by spin-coating so as to cover the driving device 9. Then, the applied photosensitive resinous material is exposed by using a photo mask, and further developed and baked. The photo mask has a pattern of the contact hole, so that the contact hole 8a is formed on the metal layer 5 stacked on the upper layer electrode 4 in the patterning step. Consequently, the insulating protective film 6 having the contact hole 8a on the metal layer 5 is formed (FIG. 14E).

Figure 14F:
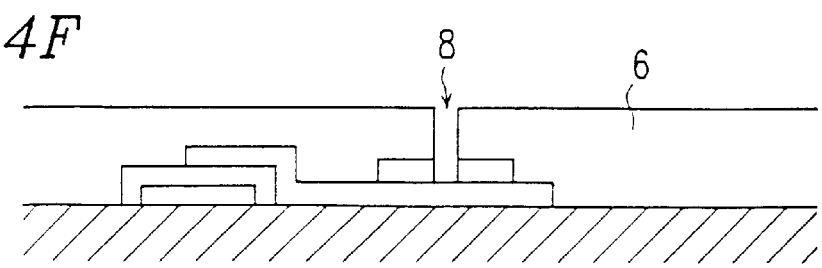

Next, using the insulating protective film 6 having the contact hole 8a formed therein as a mask, a portion of the metal layer 5 at the bottom of the contact hole 8a is removed by etching so as to expose the upper layer electrode 4. This forms the contact hole 8 in the insulating protective film 6 and the metal layer 5, reaching the upper layer electrode 4 (FIG. 14F). Consequently, at least two layers made of different metals are provided in the vicinity of the bottom of the contact hole 8.

The etching step is performed as follows. The glass substrate 1 is immersed in an etchant for etching the metal layer 5. In the present embodiment, if the metal layer 5 is formed of ITO, then, for example, hydrogen bromide (HBr) or hydrochloric acid (HCl) can be used as an etchant. In the present embodiment, an etchant temperature of about 40 to 50° C. is preferable. The development residue of the insulating protective film 6 at the bottom of the contact hole 8a is lifted off by the etchant permeating thereinto during the step of etching the portion of the metal layer 5 at the contact hole 8a.

Then, the etching of the metal layer 5 proceeds and reaches Ti of the upper layer electrode 4. In this etching step, portions of the metal layer 5 which are almost or completely free of the development residue of the organic insulating film are etched rapidly. However, because of the etching selection ratio of the metal layer 5 (ITO) and the upper layer electrode 4 (Ti), the etching substantially stops at the surface of the upper layer electrode 4 at the time when the metal layer 5 is removed.

Next, a transparent conductive film made of indium tin oxide (ITO) is deposited on the entire surface of the glass substrate 1 to a thickness of 100 nm so as to cover the insulating protective film 6 having the contact hole 8 formed therein. Then, this ITO film is patterned by using a photo mask to form the pixel electrode 7. The pixel electrode 7 is electrically connected to the upper layer electrode 4 through the contact hole 8 (FIG. 12).

Furthermore, an alignment film 103 is formed on the active matrix substrate 101 so as to cover the pixel electrodes 7 and the insulating protective film 6, and liquid crystal 104 is held between the active matrix substrate 101 and the opposing substrate 102, thereby completing the liquid crystal display apparatus 100 (FIG. 13).

In the present embodiment, all of the ITO layer 5 stacked on the upper layer electrode 4 are removed in the etching step where the insulating protective film 6 having contact hole 8a formed therein is used as a mask material. However, if the upper layer electrode 4 of the driving device 9 and the pixel electrode 7 maintain excellent electrical connection, then there is no need to remove all of the ITO layer 5. Even if the lower layer electrode 4 under the ITO layer 5 is not exposed, the development residue of the photosensitive resinous material at the location of the contact hole 8 may be sufficiently removed by etching only the surface portion of the ITO layer 5.

When the upper layer electrode 4 of the driving device at the location of the contact hole is formed of single layer of a conductor, if the etching proceeds too far, then all conductor of the upper layer electrode 4 is removed and a good electrical connection with the pixel electrode 7 cannot be obtained. Therefore, in the etching step of removing the development residue of the insulating protective film, precise control of the etching amount or the etching time becomes necessary. Furthermore, since the amount of the development residue of the insulating protective film within each contact hole is not necessarily the same, it is not necessarily the case that the similar result is obtained for all contact holes under the same etching condition.

As in the present embodiment, by making the portion where the contact hole is to be formed to have the multilayer structure of different conductors (i.e., the metal layer 5 (for example, ITO layer) is formed on the upper layer electrode 4 (e.g., titanium layer)), an excellent contact connection can be obtained for conditions ranging from the condition where only the surface portion of the metal layer (ITO layer 5) is removed by the etching step (because of this, the residue of the photosensitive resinous material is sufficiently removed) to the condition where the metal layer is completely removed. Therefore, without precisely setting the etching condition, excellent contact connection can be realized for each contact hole without deviation.

Incidentally, it is necessary that the upper layer electrode 4 is formed of a conductor having selectiveness (i.e., resistance) against the etchant for the metal layer (ITO layer 5) to be removed by etching.

(Embodiment 4)

Figure 15:
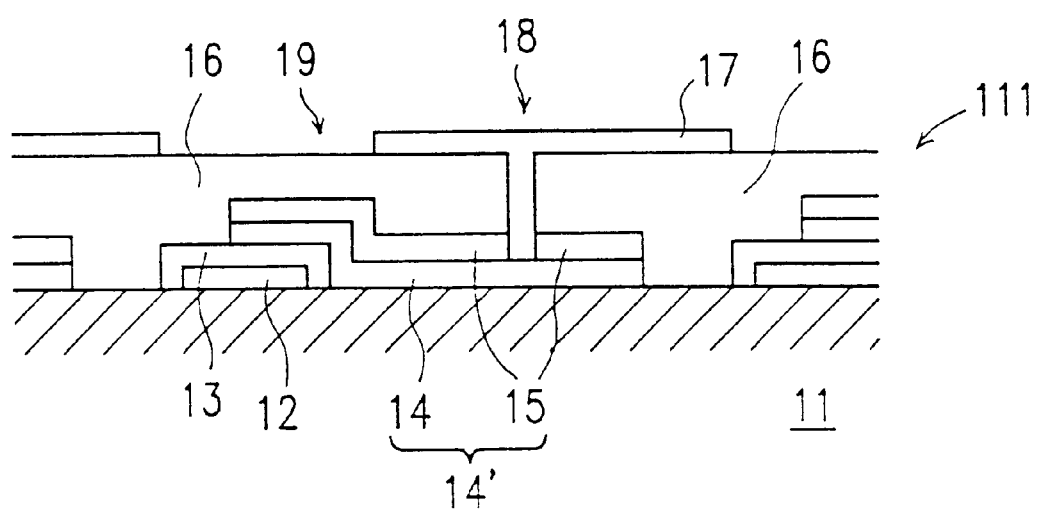
FIG. 15 is a schematic cross-sectional view of another embodiment of an active matrix substrate of the present invention.

FIG. 15 is a schematic cross-sectional view illustrating another preferred embodiment of the active matrix substrate of the present invention. Since the plane-wise structure of an active matrix substrate 111 is similar to that of the active matrix substrate 101 (FIG. 11) of Embodiment 3, the following description will be provided based on the cross-sectional view.

As illustrated in FIG. 15, the active matrix substrate 111 has a glass substrate 11, and driving signal lines having a branch 12, pixel electrodes 17 and driving devices (switching devices) 19 which are formed on the glass substrate 11. The branch 12 of the driving signal line becomes the lower electrode 12 of the driving device 19.

The active matrix substrate 111 includes a lower layer electrode 12 formed on the glass substrate 11 at the location of the driving device 19, and an insulating film 13 is formed thereon. An upper layer electrode 14' is patterned and formed on the insulating film 13. The upper layer electrode 14' has a double layer structure which includes a first layer 14 on the lower side and a second layer 15 on the upper side. The lower layer electrode 12, the insulating film 13 and the upper layer electrode 14' of the double layer structure constitute a diode type two-terminal device 19. The upper layer electrode 14' extends toward the pixel electrode 17. The contact hole 18 is to be formed on this extending portion.

An insulating protective film 16 is formed on the entire surface of the glass substrate 11 so as to cover the driving device 19. A pixel electrode 17 is patterned and formed on the insulating protective film 16. The pixel electrode 17 is electrically connected to the first layer 14 of the upper layer electrode 14' of the driving device 19 through the contact hole 18 provided in the insulating protective film 16 and the second layer 15 of the upper layer electrode 14'.

Figure 17:
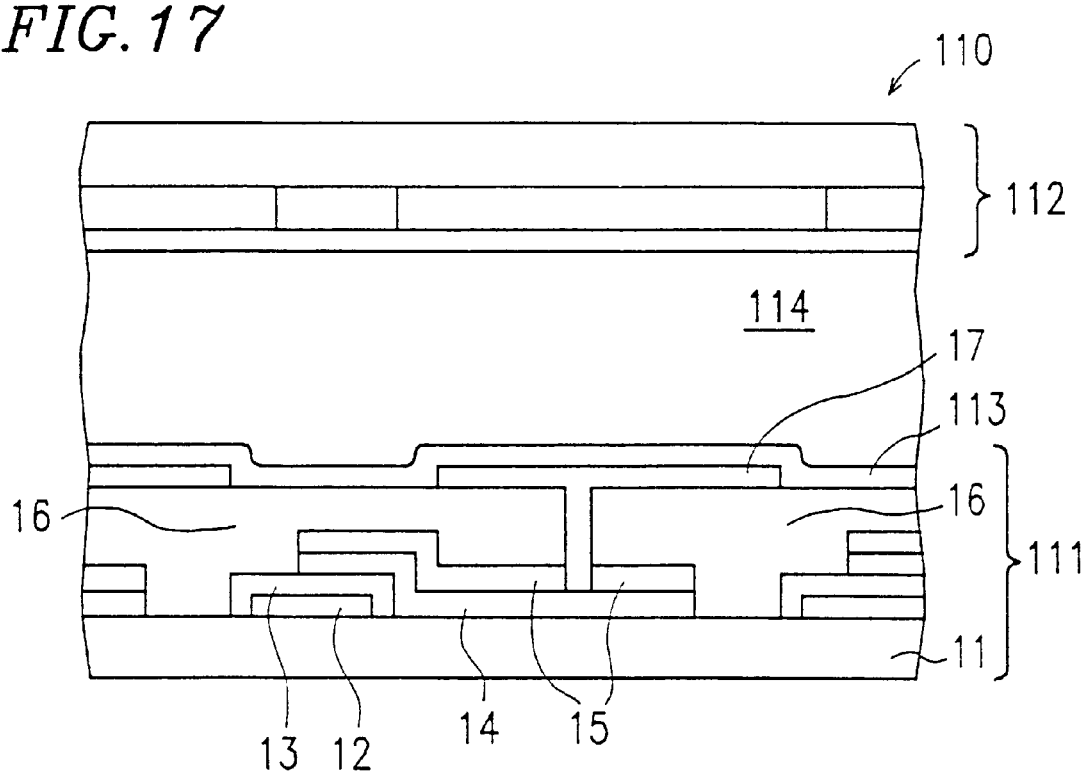
FIG. 17 is a schematic cross-sectional view of a liquid crystal display apparatus utilizing the substrate shown in FIG. 15.

The overall structure of the active matrix substrate 111 is similar to that of the conventional active matrix substrate 201 illustrated in FIG. 29, where the pixel electrodes 17 are arranged in a matrix configuration and each of the pixel electrodes 17 is connected to the driving signal line via corresponding driving device 19. The liquid crystal display apparatus 110 is produced by holding the liquid crystal layer 114 between the active matrix substrate 111 of the present embodiment and the opposing substrate 112 (FIG. 17).

Next, an exemplary method for producing the active matrix substrate and the liquid crystal display apparatus of the present embodiment will be described. FIGS. 16A to 16F are schematic cross-sectional views illustrating the production steps for the active matrix substrate 111.

Figure 16A:
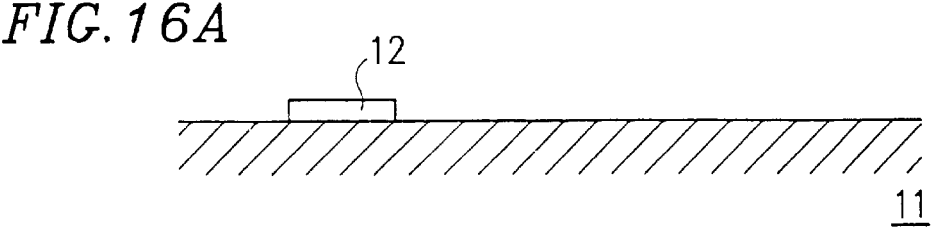
FIGS. 16A to 16F are schematic cross-sectional views of another method for producing an active matrix substrate of the present invention.

First, tantalum (Ta) is deposited on the glass substrate 11 to a thickness of 300 nm by sputtering. Then, this Ta film is patterned by using a photo mask to form the driving signal line and its branching portion, i.e., the lower layer electrode 12 (FIG. 16A).

Figure 16B:
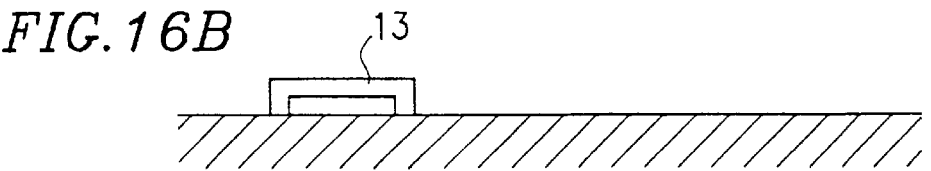

Next, an insulating film made of $SiN_x$ of 80 nm thickness is deposited on the entire surface of the glass substrate 11 by plasma CVD so as to cover the lower layer electrode 12. Then, this $SiN_x$ insulating film is patterned by using a photo mask to form the insulating layer 13 (FIG. 16B).

Figure 16C:
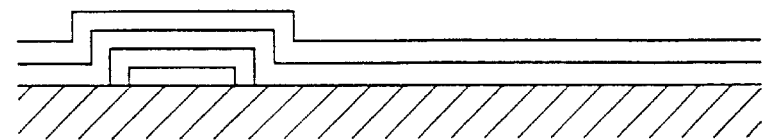

Next, titanium (Ti) is deposited to a thickness of 300 nm on the entire surface of the glass substrate 11 by sputtering (FIG. 16C). This Ti film later becomes the first layer 14 of the upper layer electrode 14'. Next, a transparent conductive film made of indium tin oxide (ITO) of 100 nm thickness is deposited on the entire surface of the Ti film by sputtering (FIG. 16C). This ITO film later becomes the second layer 15 of the upper layer electrode 14'.

Figure 16D:
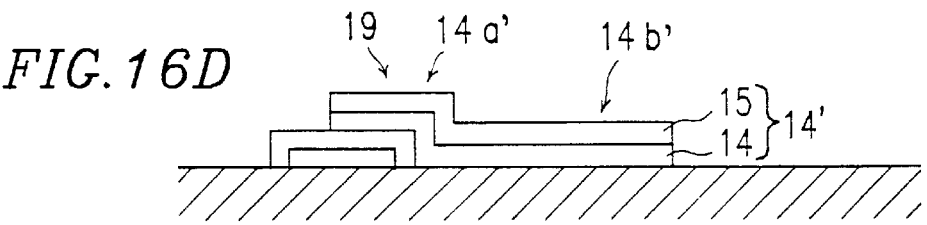

The Ti film and the ITO film deposited as described above are patterned by using a photo mask to form the upper layer electrode 14' which includes the first layer 14 and the second layer 15 (FIG. 16D). The upper layer electrode 14' is formed so that it includes a portion 14a' stacked on the lower layer electrode 12 and the insulating layer 13, and an extending portion 14b'. The contact hole 18 is to be formed at the extending portion 14b'.

Figure 16E:
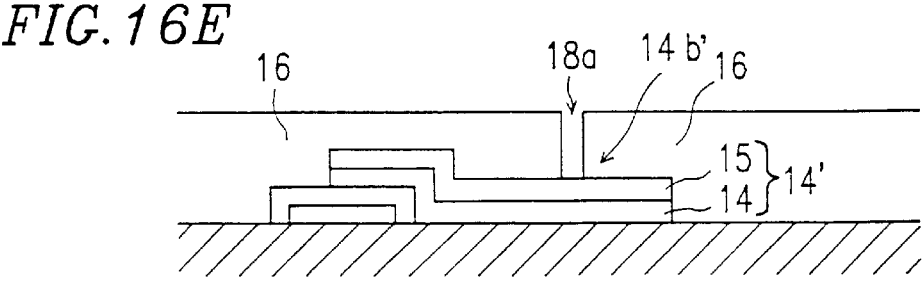

As described above, the driving device 19 having the MIM (Metal-Insulator-Metal) structure including the lower electrode 12, the insulating film 13 and the upper layer electrode 14' is formed. Next, a photosensitive resinous material is applied to a thickness of 1 $\mu$m by spin-coating or the like so as to cover the driving device 19. The applied photosensitive resinous material is exposed by using a photo mask, and further developed and baked. The photo mask has a pattern for the contact hole, and the contact hole 18a is formed on the extending portion 14b' of the upper layer electrode 14' during the patterning step. As described above, the insulating protective film 16 having the contact hole 18a is formed (FIG. 16E).

Figure 16F:
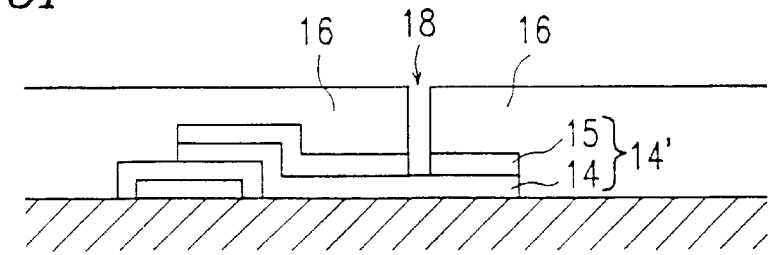

Next, using the insulating protective film 16 having the contact hole 18a formed therein as a mask material, the portion of the second layer 15 of the upper layer electrode 14' at the bottom of the contact hole 18a is removed by etching, thereby exposing the first layer 14. Then, the contact hole 18 reaching the first layer 14 is formed in the insulating protective film 16 and the second layer 15 (FIG. 16F). This etching step is similar to that in Embodiment 3.

Next, a transparent conductive film made of indium tin oxide (ITO) of 100 nm thickness is deposited on the entire surface of the glass substrate 11 so as to cover the insulating protective film 16 having the contact hole 18 formed therein. This ITO film is patterned by using a photo mask to form the pixel electrode 17. The pixel electrode 17 is electrically connected to the upper layer electrode 14' through the contact hole 18 (FIG. 15).

Furthermore, an alignment film 113 is formed on the active matrix substrate 111 so as to cover the pixel electrodes 17 and the insulating protective film 16, and liquid crystal 114 is held between the active matrix substrate 111 and the opposing substrate 112, thereby completing the liquid crystal display apparatus 110 of the present embodiment (FIG. 17).

In the present embodiment, when forming the driving device 19 on the active matrix substrate 111, two different kinds of conductors are stacked, and the upper layer electrode 14' of a multi-layer structure is formed by simultaneously patterning these conductors in one step. Although the upper layer electrode 14' is made to have a double layer structure in the present embodiment, it can be made to have a multi-layer structure including three layers or more. By removing the conductor layer 15 which is the upper layer of the upper layer electrode 14' of the multi-layer structure formed of more than two different kinds of conductors and by connecting the pixel electrode 17 to the conductor layer 14 which was under the conductor layer 15, excellent electrical connection without deviations can be obtained for each contact hole in the same manner as Embodiment 3.

In the present embodiment, in the etching step where the insulating protective film 16 having the contact hole 18a formed therein is used as a mask material, the portion of the second layer 15 on the upper layer electrode 14' at the location of the contact hole 18a is all removed. However, if the upper layer electrode 14' of the driving device 19 and the pixel electrode 17 have excellent electrical connection, then there is no need to remove all of the second layer 15. Even if the first layer 14 under the second layer 15 is not exposed, the development residue of the photosensitive resinous material at the location of the contact hole 18 is sufficiently removed by etching only the surface portion of the first layer 15.

As in the present embodiment, by making the upper layer electrode 14' to have the multi-layer structure at least of the first layer 14 and the second layer 15, an excellent contact connection can be obtained for conditions ranging from a condition that the surface of the first layer 15 is removed in the etching step (because of this, the residue of the photosensitive resinous material is sufficiently removed) to a condition that the first layer 15 is completely removed. Therefore, without precisely setting the etching condition, excellent contact connection can be realized for each contact hole without deviation.

Incidentally, it is necessary that the first layer 14 under the upper layer is formed of a conductor having selectiveness (i.e., resistance) against the etchant for the metal (ITO) of the second layer 15 formed as the upper layer to be removed by etching.

As described above, according to the active matrix substrate 111 of the present embodiment and the production method thereof, a liquid crystal display apparatus of excellent display quality and having less pixel defects is obtained.

Furthermore, in the present embodiment, stacked conductive layers are simultaneously patterned to form the upper layer electrode 14', the patterning process may further be simplified.

(Embodiment 5)

Figure 18:
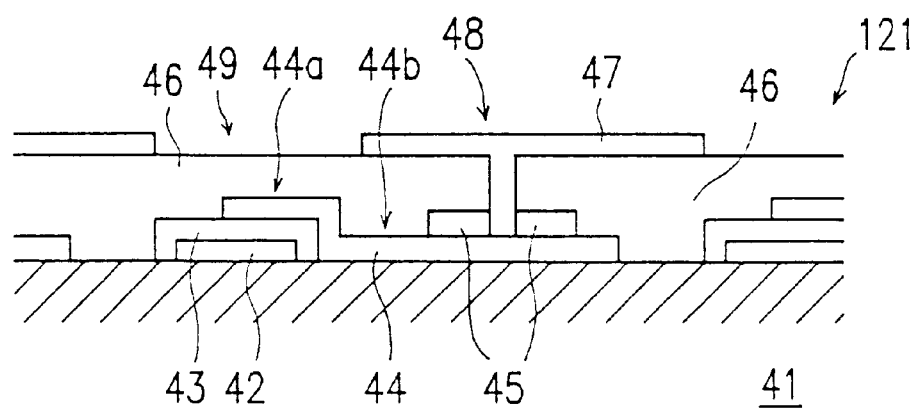
FIG. 18 is a schematic cross-sectional view of still another embodiment of an active matrix substrate of the present invention.

FIG. 18 is a schematic cross-sectional view illustrating still another preferred embodiment of an active matrix substrate of the present invention. FIG. 19 is a plan view illustrating an overall structure of the active matrix substrate 121. In the active matrix substrate 121 of the present embodiment, pixel electrodes are formed of a light blocking metal film.

As illustrated in FIGS. 18 and 19, the active matrix substrate 121 has a glass substrate 41, and driving signal lines 40, pixel electrodes 47 and driving devices 49 (switching devices) formed on the glass substrate 41. The structure of each pixel portion is similar to that of the active matrix substrate 101 illustrated in FIG. 11, and a portion branching from the driving signal line 40 serves as the lower layer electrode 42 of the driving device 49.

As illustrated in FIG. 18, a lower layer electrode 42 is formed on the glass substrate 41 at the location of the driving device 49, and an insulating film 43 is formed thereon. An upper layer electrode 44 is patterned and formed on the insulating film 43. The upper layer electrode 44 has a portion 44a stacking on the lower layer electrode 42 with the insulating film 43 interposed therebetween and an extending portion 44b extending toward the pixel electrode 47 side. The lower layer electrode 42, the insulating film 43 and the upper layer electrode 44 constitute a diode type two-terminal device 49. A metal layer 45 is formed on the extending portion 44b of the upper layer electrode 44.

An insulating protective film 46 is formed on the entire surface of the glass substrate 41 so as to cover the driving device 49. A pixel electrode 47 is patterned and formed on the insulating protective film 46. The pixel electrode 47 is electrically connected to the upper layer electrode 44 of the driving device 49 through the contact hole provided in the insulating protective film 46 and the metal layer 45.

Moreover, as illustrated in FIG. 19, the active matrix substrate 121 includes the pixel electrodes 47 arranged in a matrix configuration, and each pixel electrode 47 is connected to the driving signal line 40 via corresponding driving device 49. An external connection terminal 50a is formed at the end of each driving line 40. Similar to the liquid crystal display apparatus in the above-described Embodiments 3 and 4, liquid crystal is held between the active matrix substrate 121 and the opposing substrate to form a liquid crystal display apparatus (not shown).

Next, a method for producing the active matrix substrate and the liquid crystal display apparatus according to the present embodiment will be described. FIGS. 20A to 20F are schematic cross-sectional views illustrating the production steps for the active matrix substrate 121.

Figure 20A:
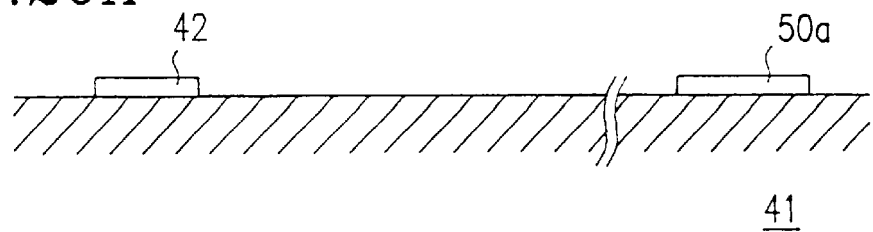
FIGS. 20A to 20F are schematic cross-sectional views illustrating still another example of a method for producing an active matrix substrate of the present invention.

First, tantalum (Ta) is deposited on the glass substrate 41 to a thickness of 500 nm by sputtering. Then, this Ta film is patterned by using a photo mask to form the driving signal line 40, its branching portion, i.e., the lower layer electrode 42 and the external connection terminal 50a (FIG. 20A).

Figure 20B:
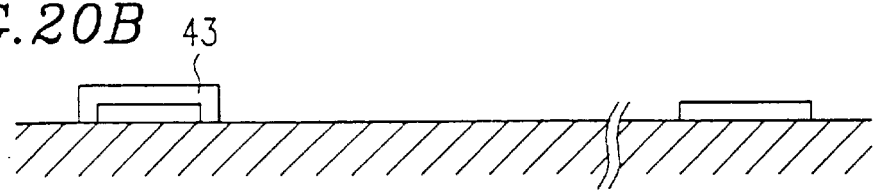

Next, an insulating film of 100 nm thickness made of $SiN_x$ is deposited on the entire surface of the glass substrate 41 by plasma CVD so as to cover the lower layer electrode 42. This $SiN_x$ insulating film is patterned by using a photo mask to form the insulating layer 43 (FIG. 20B).

Figure 20C:
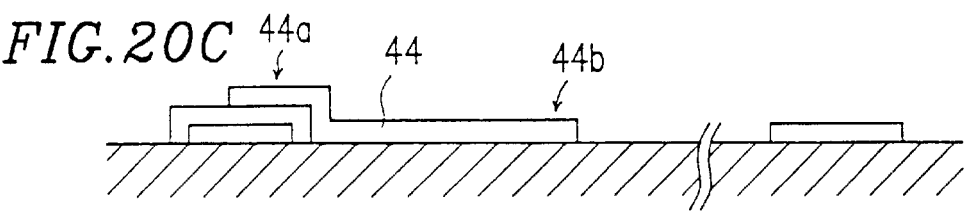

Next, titanium (Ti) is deposited on the entire surface of the glass substrate 41 to a thickness of 500 nm by sputtering. This Ti film is patterned by using a photo mask to form the upper layer electrode 44 (FIG. 20C). The upper layer electrode 44 is formed so that it includes a portion 44a stacking on the lower layer electrode 42 and the insulating layer 43, and an extending portion 44b. As described above, the driving device 49 having the MIM (Metal-Insulator-Metal) structure including the lower electrode 42, the insulating film 43 and the upper layer electrode 44 is formed.

Figure 20D:
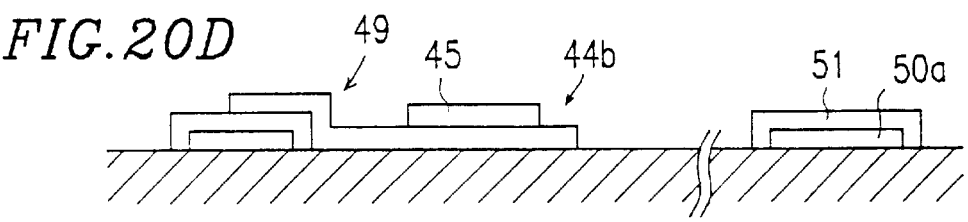

Next, a transparent conductive film of 100 nm thickness made of indium tin oxide (ITO) is deposited on the entire surface of the substrate 41 by sputtering. This ITO film is patterned by using a photo mask to form a metal layer 45 on the extending portion 44b of the upper layer electrode 44, and at the same time, a connection auxiliary conductive layer 51 is formed on the external connection terminal 50a (FIG. 20D). The contact hole 48 is to be formed at the location of the metal layer 45. Since it is sometimes difficult for the external connection terminal 50a, which is formed at the same time as the lower layer electrode 42, to achieve excellent electrical connection by itself, the electrical connection is enhanced by forming the connection auxiliary conductive layer 51. As described above, by forming the conductive layer 45 (metal layer) in the same step as the connection auxiliary conductive layer 51, the production process can be simplified. If the same conductive layer as the pixel electrodes 47 is used for the metal layer forming the connection auxiliary conductive layer 51, then there is a possibility that the connection auxiliary conductive layer 51 is removed in the step of patterning the pixel electrodes 47. Therefore, it is preferable that the connection auxiliary conductive layer 51 is formed of a different metal than the pixel electrodes 47.

Figure 20E:
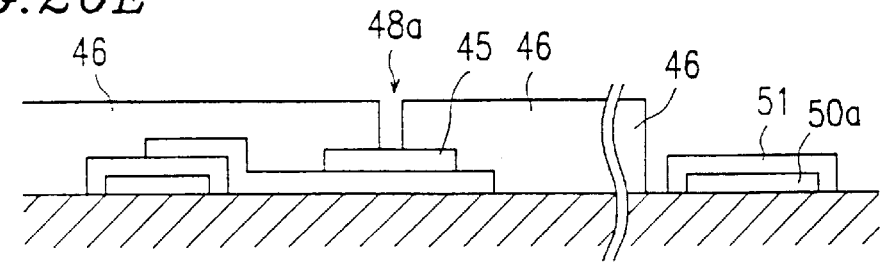

Next, a photosensitive resinous material is applied to a thickness of 1 μm by spin-coating or the like so as to cover the driving device 49. The applied photosensitive resinous material is exposed by using a photo mask, and is further developed and baked to form the insulating protective film 46. The insulating protective film 46 is patterned in such a manner that only the region where the pixel electrodes are to be formed in a matrix configuration in later steps are covered, but the portion where the external connection terminal 50a and the auxiliary conductive layer 51 thereon are formed are exposed. Moreover, the photo mask has a pattern for the contact hole, and the contact hole 48a is simultaneously formed on the metal layer 45 stacked on the upper layer electrode 44 in this patterning step. As described above, the insulating protective film 46 having the contact hole 48a formed on the metal layer 45 is formed (FIG. 20E).

Figure 20F:
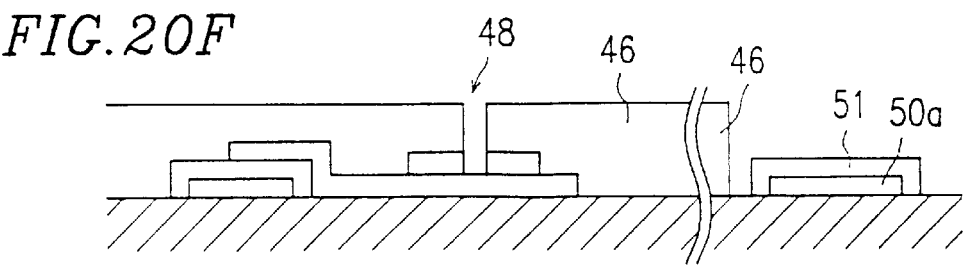
Figure 21A:
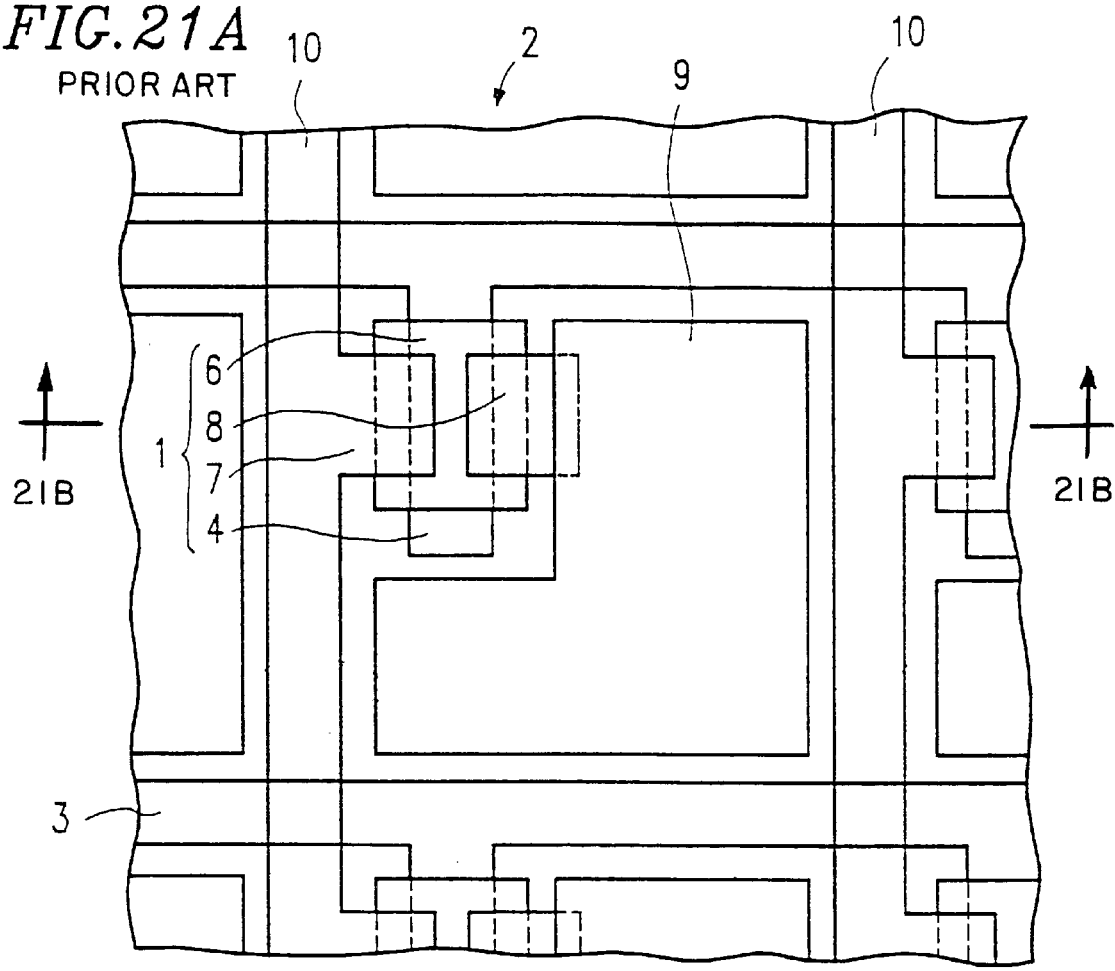
FIG. 21A is a partial plan view illustrating an active matrix substrate of a conventional liquid crystal display apparatus.
Figure 21B:
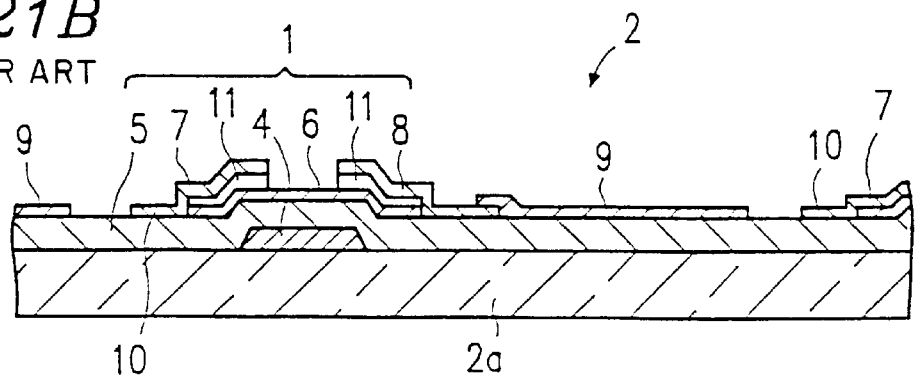
FIG. 21B is a cross-sectional view of the active matrix substrate shown in FIG. 21A taken along the line B—B.

Next, using the insulating protective film 46 having the contact hole 48a formed therein as a mask material, a portion of the metal layer 45 at the bottom of the contact hole 48a is removed by etching, thereby exposing the upper layer electrode 44. As a result, the contact hole 48 reaching the upper layer electrode 44 is formed in the insulating protective film 46 and the metal layer 45 (FIG. 20F).

This etching step is performed as follows. The glass substrate 41 is immersed in an etchant for etching the metal layer 45. In the present embodiment, when the metal layer 45 is formed of ITO, hydrogen bromide (HBr), hydrochloric acid (HCl), etc., for example, can be used as the etchant. Moreover, a temperature in the range of about 40 to 50° C. is preferable. In the step of etching the portion of the metal layer 45 at the location of the contact hole 48a, the development residue of the insulating protective film 46 at the bottom of the contact hole 48a is lifted off by the etchant permeating thereinto.

Then, the etching of the metal layer 45 proceeds and Ti of the lower layer electrode 44 is reached. In this etching process, the portion of the metal layer 45 almost free of or completely free of the development residue of the organic insulating film is rapidly etched. However, because of the etching selection ratio of the metal layer 45 (ITO) and the upper layer electrode 44 (Ti), the etching substantially stops at the surface of the upper layer electrode 44 at the time the metal layer 45 is removed.

Next, aluminum (Al) is deposited on the entire surface of the glass substrate 41 to a thickness of 300 nm so as to cover the insulating protective film 46 having the contact hole 48. This Al film is patterned by using a photo mask to form the pixel electrodes 47. The pixel electrode 47 is electrically connected to the upper layer electrode 44 through the contact hole 48 (FIG. 18).

The subsequent steps are the same as those in Embodiment 3, where an alignment film is formed on the active matrix substrate 121 and liquid crystal is held between the active matrix substrate 121 and the opposing substrate, thereby completing the liquid crystal display apparatus of the present embodiment (not shown).

In the present embodiment, in the etching step where the insulating protective film 46 having the contact hole 48a formed therein is used as a mask material, the portion of the ITO layer 45 stacked on the upper layer electrode 44 is completely removed. However, if the upper layer electrode 44 of the driving device 49 and the pixel electrode 47 have excellent electrical connection, then there is no need to completely remove the portion of the ITO layer 45. Even if the upper layer electrode 44 under the ITO layer 45 is not exposed, the development residue of the photosensitive resinous material at the location of the contact hole 48 is sufficiently removed by etching only the surface portion of the ITO layer 45.

Also in the present embodiment, as in Embodiment 3, by making the portion where the contact hole is to be formed to have a multi-layer structure (the ITO layer 45 is stacked on the upper layer electrode 44), an excellent contact connection can be obtained for conditions ranging from a condition that only the surface portion of the ITO layer 45 is removed in the etching step (this sufficiently removes the residue of the photosensitive resinous material) to a condition that the ITO layer is completely removed. Therefore, an excellent contact connection having no deviation can be realized for every contact hole without precisely setting the etching conditions.

Incidentally, it is necessary that the upper layer electrode 44 under the ITO layer 45 is formed of a conductor having selectiveness (resistance) against an etchant for the ITO layer 45 to be removed by etching.

Although a glass substrate is used as a substrate in the above-described Embodiments 1 to 5, a quartz substrate, a plastic substrate, a Si substrate, etc. can be used if necessary.

The above-described Embodiments 1 to 5 may be appropriately combined. For example, a reflecting plate may be formed by applying a non-photosensitive resin onto the active matrix substrate having TFT devices formed thereon, or by applying a photosensitive resin onto the active matrix substrate having MIM devices formed thereon. Furthermore, as illustrated in Embodiments 3 and 4, the present invention may be applied not only to a reflection type liquid crystal display apparatus but also to a transmission type liquid crystal display apparatus.

According to the present invention, the drawing-out electrode formed under the contact hole has at least two different metal layers, the uppermost layer of which is removed in the direction of thickness partially or until the underlying metal layer is reached. The removal of the uppermost metal layer is performed first by forming a contact hole in the insulating protective film and then by etching the portion under the contact hole, using the insulating protective film as a mask. Since the development residue of the organic insulating film at the contact hole is lifted off during etching, the developing time does not have to be long in order to obtain excellent continuity of the contact hole. Therefore, an excessive development of the organic insulating film and a decrease in the film thickness can be prevented. As a result, excellent connection of the contact hole may be obtained without deviation throughout the substrate, and consequently, a liquid crystal display apparatus with no pixel defects and having excellent image characteristics is obtained.

The advantageous effect of the present invention is particularly noticeable when a reflection type liquid crystal display apparatus is produced by using a large substrate (for example, 300 mm×300 mm or greater). That is, a liquid crystal display apparatus having excellent reflection characteristics (for example, 100 or greater) throughout the substrate and having less deviation in reflection characteristics (for example, 10% or less) of the reflecting plate for a portion formed in the central region of the substrate and for a portion in the peripheral region of the substrate. Furthermore, a liquid crystal display apparatus whose cell gap (thickness of the liquid crystal layer) can be measured even if a reflecting plate having excellent reflection characteristics (high scattering effect) is included in the liquid crystal cell substrate is obtained. That is, a reflection type liquid crystal display apparatus whose production management is simple and which has a stable quality is obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reflection type liquid crystal display apparatus comprising:
   a first substrate having a plurality of reflecting electrodes;
   a second substrate having a light transmitting electrode; and
   a liquid crystal layer disposed between said first substrate and said second substrate, wherein:
   said first substrate comprises an insulating substrate, a switching device provided on said insulating substrate for supplying a display voltage signal to said reflecting electrode, a drawing-out electrode connected to said switching device and extending under said reflecting electrode, and an insulating resin layer having a contact hole on said drawing-out electrode;
   said reflecting electrode is provided on said insulating resin layer, corresponding to each pixel, so as to cover said contact hole, and is electrically connected to said drawing-out electrode at the bottom of said contact hole;
   said drawing-out electrode has at least two different metal layers in a region larger than a bottom of said contact hole, said region including the bottom of said contact hole; and
   a metal layer which is an uppermost layer of said drawing-out electrode is removed at the bottom of said contact hole in the direction of a thickness either partially or until an underlying metal layer is reached.

2. A reflection type liquid crystal display apparatus according to claim 1, wherein an opening area of said contact hole formed in said insulating resin layer is (i) 400 $\mu m^2$ or more and (ii) 8% or less of an area of said reflecting electrode, wherein the reflecting electrode is at least 5000 $\mu m^2$.

3. A reflection type liquid crystal display apparatus according to claim 1, wherein:
   said switching device is a thin film transistor;
   a lower metal layer formed on a portion of said drawing-out electrode at said contact hole is formed of the same material as a gate electrode of said thin film transistor; and
   an upper metal layer of said drawing-out electrode is formed of the same material as a drain electrode of said thin film transistor.

4. A reflection type liquid crystal display apparatus according to claim 3, wherein the lower metal layer formed on a portion of said drawing-out electrode at said contact hole is made of a material selected from the group consisting of tantalum, tantalum containing nitrogen in an amount of more than 0 atomic % and less or equal to 50 atomic %, and tantalum containing molybdenum, and the upper metal layer is made of titanium.

5. A reflection type liquid crystal display apparatus according to claim 1, wherein said insulating resin layer has an uneven surface in a region where said reflecting electrode is formed.

6. A reflection type liquid crystal display apparatus according to claim 5, wherein said uneven surface is formed except in a region of said contact hole.

7. A reflection type liquid crystal display apparatus according to claim 6, wherein said reflecting electrode is formed so as to have a mirror surface at a bottom of said contact hole.

8. A method for producing a reflection type liquid crystal display apparatus comprising a first substrate having a plurality of reflecting electrodes, a second substrate having a light transmitting electrode, and a liquid crystal layer disposed between said first substrate and said second substrate, said method comprising the steps of:
   forming a switching device on an insulating substrate for supplying a display voltage signal to said reflecting electrode;
   forming a drawing-out electrode connected to said switching device and extending under said reflecting electrode, said drawing-out electrode having at least two different metal layers in at least one region;
   forming an insulating resin layer over said switching device and said drawing-out electrode;
   forming a contact hole in a portion of said insulating resin layer on a region where said metal layers of said drawing-out electrode are formed;
   performing etching on a metal layer which is an uppermost layer of said drawing-out electrode by using an etchant, so that said uppermost layer at the bottom of said contact hole is removed at least partially in the direction of a thickness until an underlying metal layer is reached; and
   forming a reflecting electrode on said insulating resin layer, corresponding to each pixel, so as to cover said contact hole.

9. A method for producing a reflection type liquid crystal display apparatus according to claim 8, wherein an opening area of said contact hole is (i) 400 $\mu m^2$ or more and (ii) 8% or less of an area of said reflecting electrode, wherein the reflecting electrode is at least 5000 $\mu m^2$.

10. A method for producing a reflection type liquid crystal display apparatus according to claim 8, wherein:
    said switching device is a thin film transistor;
    a lower metal layer of said drawing-out electrode is formed of the same material as a gate electrode of said thin film transistor; and
    an upper metal layer of said drawing-out electrode is formed of the same material as a source electrode of said thin film transistor.

11. A method for producing a reflection type liquid crystal display apparatus according to claim 8, wherein, in the step of forming said drawing-out electrode, the lower metal layer is formed of a material selected from the group consisting of tantalum, tantalum containing nitrogen in an amount of more than 0 atomic % and less or equal to 50 atomic %, and tantalum containing molybdenum, and the upper metal layer is formed of titanium.

12. A method for producing a reflection type liquid crystal display apparatus according to claim 8, wherein the step of forming said insulating resin layer comprises the steps of:
    forming a protrusion pattern made of an insulating resin in a region where said reflecting electrode is formed exclusive of a region where said contact hole is formed; and
    forming a second insulating resin layer on said protrusion pattern by applying the same insulating resin, wherein said contact hole is formed in said second insulating resin layer.

13. A method for producing a reflection type liquid crystal display apparatus according to claim 12, wherein said reflecting electrode formed on said insulating resin layer has a scattering property, and said reflecting electrode is formed so that a portion thereof at the bottom of said contact hole has a mirror surface.

14. A method for producing a reflection type liquid crystal display apparatus according to claim 13, further comprising the step of measuring a thickness of said liquid crystal layer by using light reflected at a portion of said reflecting electrode in a mirror-face condition at the bottom of said contact hole.

15. A method for producing a reflection type liquid crystal display apparatus according to claim 8, wherein said etchant is a mixture containing hydrogen fluoride of a concentration of 0.25% to 1.00%.

* * * * *